United States Patent
Hu et al.

(10) Patent No.: US 12,056,412 B2
(45) Date of Patent: Aug. 6, 2024

(54) IMAGE DISPLAY METHOD AND ELECTRONIC DEVICE

(71) Applicant: HUAWEI TECHNOLOGIES CO., LTD., Guangdong (CN)

(72) Inventors: Zhikun Hu, Shanghai (CN); Feng He, Shanghai (CN); Xianggen Liu, Shanghai (CN); Chunlin Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/914,260

(22) PCT Filed: Mar. 16, 2021

(86) PCT No.: PCT/CN2021/080998
§ 371 (c)(1),
(2) Date: Sep. 23, 2022

(87) PCT Pub. No.: WO2021/190350
PCT Pub. Date: Sep. 30, 2021

(65) Prior Publication Data
US 2023/0114178 A1    Apr. 13, 2023

(30) Foreign Application Priority Data
Mar. 26, 2020 (CN) .......................... 202010225460.X

(51) Int. Cl.
*G06F 3/14* (2006.01)
*G01C 21/16* (2006.01)
(Continued)

(52) U.S. Cl.
CPC ............ *G06F 3/14* (2013.01); *G01C 21/1656* (2020.08); *G01S 19/01* (2013.01); *G06T 7/70* (2017.01); *G06T 17/00* (2013.01)

(58) Field of Classification Search
None
See application file for complete search history.

(56) References Cited

U.S. PATENT DOCUMENTS 9,632,314 B2 * 4/2017 Cho .................... G02B 27/017
9,904,500 B2 * 2/2018 Durlach ................... G06F 3/14
(Continued)

FOREIGN PATENT DOCUMENTS

| CN | 103471580 A | 12/2013 |
|----|-------------|---------|
| CN | 103959220 B | 5/2017 |

(Continued)

OTHER PUBLICATIONS

Extended European Search Report in European Appln No. 21776003.2, dated Jul. 6, 2023, 7 pages.

(Continued)

*Primary Examiner* — Duane N Taylor, Jr.
(74) *Attorney, Agent, or Firm* — Fish & Richardson P.C.

(57) ABSTRACT

This application provides example image display methods, media, and electronic devices. One example method includes detecting, by an electronic device that has a camera and a display, an operation of opening experience data by a user, where the experience data is stored in the electronic device and includes video data, and the video data includes multiple frames of images. A first interface is displayed in response to the operation, where the first interface includes a first image. Pose change information is determined within a preset duration, where the pose change information includes location movement information of the electronic device and pose change information of the camera. A second image including digital signage or a 3D virtual object is displayed based on pose data during collection of the first image and based on the pose change information, where the multiple frames of images include the second image.

20 Claims, 27 Drawing Sheets

(51) Int. Cl.
  *G01S 19/01* (2010.01)
  *G06T 7/70* (2017.01)
  *G06T 17/00* (2006.01)

(56) References Cited

U.S. PATENT DOCUMENTS

| | | | |
|---|---|---|---|
| 10,712,819 B2* | 7/2020 | Byerley | G06T 19/006 |
| 2011/0279697 A1 | 11/2011 | Shingu et al. | |
| 2012/0306850 A1 | 12/2012 | Balan et al. | |
| 2013/0169626 A1 | 7/2013 | Balan et al. | |
| 2013/0278631 A1* | 10/2013 | Border | G06Q 30/02 |
| | | | 345/633 |
| 2018/0246698 A1 | 8/2018 | Huang | |
| 2018/0253900 A1 | 9/2018 | Finding et al. | |
| 2018/0374192 A1* | 12/2018 | Kunkel | H04N 23/58 |
| 2019/0121522 A1* | 4/2019 | Davis | G06V 40/28 |

FOREIGN PATENT DOCUMENTS

| | | |
|---|---|---|
| CN | 107590754 A | 1/2018 |
| CN | 109069928 A | 12/2018 |
| CN | 110286773 A | 9/2019 |
| WO | 2018120657 A1 | 7/2018 |
| WO | 2018121383 A1 | 7/2018 |
| WO | 2021211272 A1 | 10/2021 |

OTHER PUBLICATIONS

Office Action in Chinese Appln. No. 202010225460.X, dated Apr. 26, 2022, 7 pages (with English translation).

International Search Report and Written Opinion in International Appln. No. PCT/CN2021/080998, mailed on Jun. 1, 2021, 17 pages (with English translation).

* cited by examiner (a)

(b)

Lee walks 10 meters northeast from a current scene during Songshan lake research center photographing After receiving experience at home, Laura walks 10 meters northeast from her current location (a)

(b)

IMAGE DISPLAY METHOD AND ELECTRONIC DEVICE

This application is a national stage of International Application No. PCT/CN2021/080998, filed on Mar. 16, 2021, which claims priority to Chinese Patent Application No. 202010225460.X, filed on Mar. 26, 2020. Both of the aforementioned applications are hereby incorporated by reference in their entireties.

TECHNICAL FIELD

This application relates to the terminal field, and more specifically, to an image display method and an electronic device.

BACKGROUND

Currently, augmented reality (augmented reality, AR) or virtual reality (virtual reality, VR) provides a brand-new digital world experience for a user. However, currently, there is no corresponding storage format for data in an experience process. As a result, to store or share the data, the user has to record a corresponding scenario by performing screen recording and then saving the recorded data as a video. However, after the scenario is stored or shared as the video, the user or a receiver who is shared with the video fails to immerse themselves when playing the video back. This is equivalent to watching the video, and the user has a poor immersive experience.

SUMMARY

This application provides an image display method and an electronic device, to help improve an immersive experience of a user.

According to a first aspect, an image display method is provided. The method is applied to an electronic device having a camera and a display, the electronic device stores experience data, the experience data includes video data, pose data, and one or more digital resources, the video data includes a plurality of frames of images, the pose data includes location information and an orientation of the camera during collection of each of the plurality of frames of images, and the digital resources include digital signage or a three-dimensional (3D) model of an object in each of the plurality of frames of images. The method includes: The electronic device detects an operation of opening the experience data by a user; the electronic device displays a first interface by using the display in response to the operation, where the first interface includes a first image, and the plurality of frames of images include the first image; the electronic device determines pose change information within preset duration, where the pose change information includes location movement information of the electronic device and pose change information of the camera; and the electronic device displays, by using the display based on pose data during collection of the first image and based on the pose change information, a second image including digital signage or a 3D virtual object, where the plurality of frames of images include the second image.

In this embodiment of this application, the electronic device may store the experience data. When the user opens the experience data again by using the electronic device, the electronic device may perform data experience again based on a current location and a change of a camera posture. The experience data may not only be watched as a video, but may be experienced based on a scenario in which the experience data is recorded. The user has an immersive feeling. This helps improve an immersive experience of the user.

In an embodiment, the experience data stored in the electronic device may be previously recorded by the electronic device and locally stored in the electronic device, or may be sent by another electronic device to the electronic device.

With reference to the first aspect, in some implementations of the first aspect, the first interface image includes prompt information, the prompt information is used to prompt the user to experience based on a preset path, and the preset path is a moving path during collection of the experience data.

In this embodiment of this application, the first interface may include information about the preset path, and the preset path is a path that the user walks when recording the experience data on site. In this case, when the user experiences the experience data again or sends the experience data to another user, the user or the another user may experience the experience data based on the preset path. In this way, it can be ensured that the user quickly experiences the experience data.

With reference to the first aspect, in some implementations of the first aspect, the pose data during collection of the first image is determined by a cloud server.

In this embodiment of this application, the experience data stored in the electronic device includes the pose data determined by the cloud server. In this way, when the second image is displayed, new pose data may be directly determined based on the pose data determined by the cloud server and an onsite pose change of the electronic device, so as to perform image rendering. In this way, image rendering efficiency is improved, and the user is prevented from requesting pose data from the cloud server again.

With reference to the first aspect, in some implementations of the first aspect, that the electronic device determines pose change information within preset duration includes: the electronic device determines the pose change information based on changes of data of a global positioning system GPS, a location based service LBS, and an inertial measurement unit IMU detected at a start moment and an end moment of the preset duration.

In this embodiment of this application, the electronic device may use GPS data, LBS data, and IMU data during collection of the first image as reference values, and use changes of GPS data, LBS data, and IMU data of the electronic device as relative movement data, to obtain new pose data by adding the relative movement data to the reference values. This ensures that the user feels a scene of recording the experience data in an immersive manner, thereby improving an immersive experience of the user.

With reference to the first aspect, in some implementations of the first aspect, the pose data and the digital resources are stored by using serialized data.

In this embodiment of this application, the pose data and the digital resources may be stored by using the serialized data. In this way, storage space required when the electronic device stores the pose data and the digital resources can be reduced, thereby improving data storage efficiency.

According to a second aspect, an image display method is provided. The method is applied to an electronic device having a camera and a display, the electronic device stores experience data, the experience data includes video data, location information, sensor data, and one or more digital resources, the video data includes a plurality of frames of images, the location information includes location information determined by the electronic device during collection of each of the plurality of frames of images, the sensor data includes data collected by a sensor during collection of each of the plurality of frames of images, and the digital resources include digital signage or a 3D model of an object in each of the plurality of frames of images. The method includes: The electronic device detects an operation of opening the experience data by a user; in response to the operation, the electronic device displays a first interface by using the display, where the first interface includes a first image, and the plurality of frames of images include the first image; the electronic device sends, to a cloud server, the first image, location information determined by the electronic device during collection of the first image, and sensor data determined by the electronic device, and the electronic device receives location information and orientation information of the camera that are sent by the cloud server and that are determined by the cloud server during collection of the first image; the electronic device determines pose change information within preset duration, where the pose change information includes location movement information of the electronic device and pose change information of the camera; and the electronic device displays, by using the display based on the location information and the orientation information of the camera that are determined by the cloud server during collection of the first image, and the pose change information, a second image including digital signage or a 3D virtual object, where the plurality of frames of images include the second image.

In this embodiment of this application, the electronic device may store the location information and the sensor data that are determined by the electronic device itself. When the electronic device opens the experience data again, the electronic device may upload, to the cloud server while displaying the first image, the location information and the sensor data that are determined by the electronic device during collection of the first image. The cloud server calculates accurate location information of the electronic device and an orientation of the camera during collection of the first image, so that the electronic device determines new pose data based on the location information and the orientation of the camera that are determined by the cloud server, and an onsite pose change of the electronic device, so as to perform image rendering. This ensures that the user feels a recording scenario in an immersive manner, and improves an immersive experience of the user.

According to a third aspect, this technical solution provides an image display apparatus. The apparatus is included in an electronic device, and the apparatus has a function of implementing behavior of the electronic device in the first aspect to the second aspect and the possible implementations of the first aspect to the second aspect. The function may be implemented by hardware, or may be implemented by executing corresponding software by hardware. The hardware or the software includes one or more modules or units corresponding to the foregoing function.

According to a fourth aspect, an electronic device is provided, including one or more processors and one or more memories. The one or more memories are coupled to the one or more processors, the one or more memories are configured to store computer program code, the computer program code includes computer instructions, and when the one or more processors execute the computer instructions, the electronic device is enabled to perform the image display method in any one of the first aspect, the second aspect, and the possible implementations of the first aspect and the second aspect.

According to a fifth aspect, an electronic device is provided, including one or more processors and one or more memories. The one or more memories are coupled to the one or more processors, the one or more memories are configured to store computer program code, the computer program code includes computer instructions, and when the one or more processors execute the computer instructions, the electronic device is enabled to perform the image display method in any one of the first aspect, the second aspect, and the possible implementations of the first aspect and the second aspect.

According to a sixth aspect, this technical solution provides a computer storage medium, including computer instructions. When the computer instructions are run on an electronic device, the electronic device is enabled to perform the image display method in any one of the first aspect, the second aspect, and the possible implementations of the first aspect and the second aspect.

According to a seventh aspect, this technical solution provides a computer program product. When the computer program product runs on an electronic device, the electronic device is enabled to perform the image display method in any one of the first aspect, the second aspect, and the possible implementations of the first aspect and the second aspect.

DESCRIPTION OF EMBODIMENTS

The following describes the technical solutions in embodiments of this application with reference to the accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

A method provided in embodiments of this application may be applied to an electronic device, for example, a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC, a netbook, or a personal digital assistant (personal digital assistant, PDA). A specific type of the electronic device is not limited in embodiments of this application.

Figure 1:
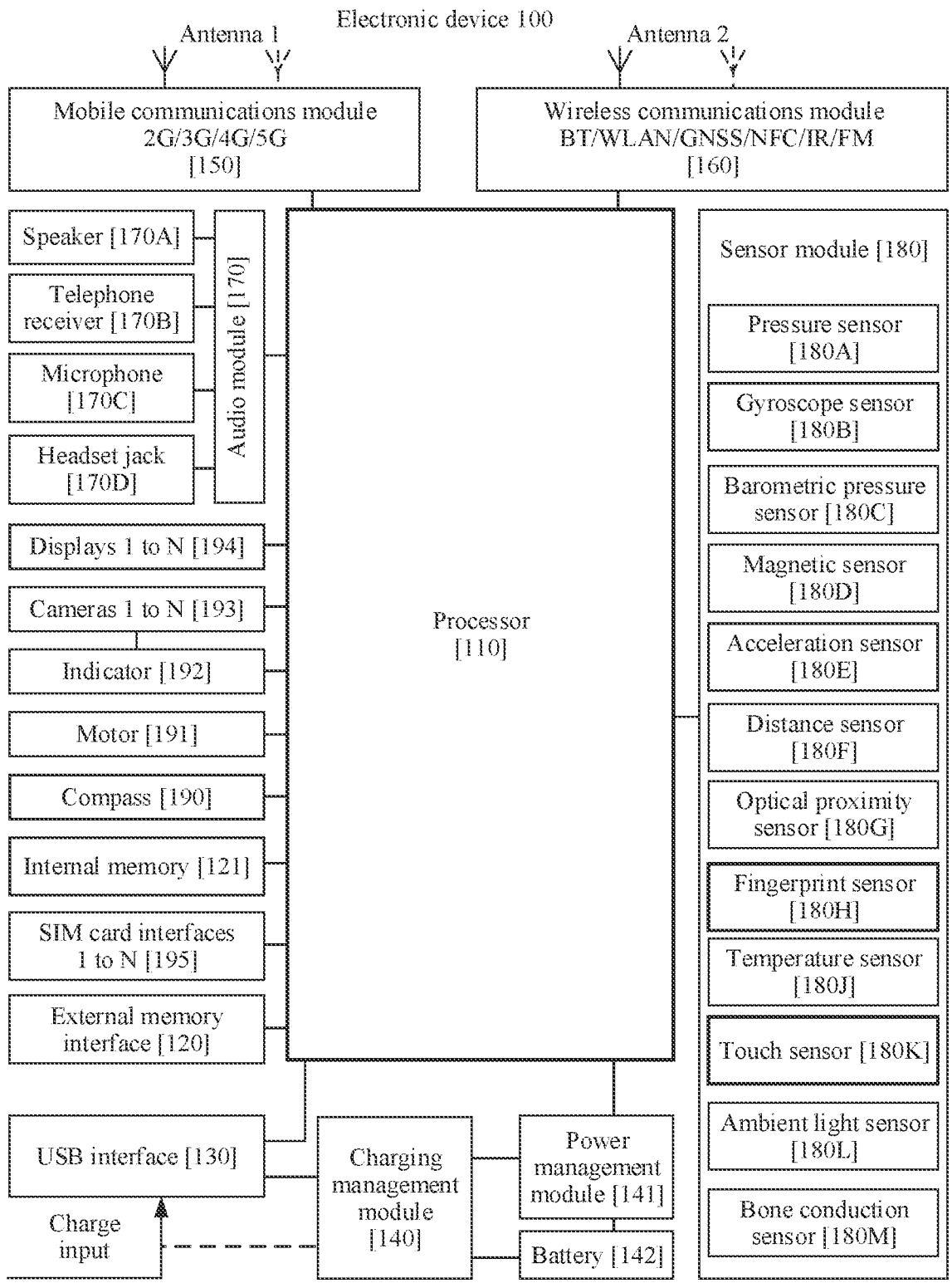
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna. 2, a mobile communications module 150, a wireless communications module 160, an audio module 170, a speaker 170A, a telephone receiver 170B a microphone 170C, a headset jack 1701), a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180F, a distance sensor 180F, an optical proximity sensor 180G, a fingerprint sensor 180H, a temperature sensor 180J, a touch sensor 180K, an ambient light sensor 180L, a boric conduction sensor 180M, and the like.

It can be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is configured to perform asynchronous communication.

The MIPI interface may be configured to connect the processor 110 to a peripheral device such as the display 194 or the camera 193.

The GPIO interface may be configured by software. The GPIO interface may be configured as a control signal or a data signal.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may alternatively be configured to connect to another electronic device such as an AR device.

It can be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The charging management module 140 is configured to receive a charging input from the charger.

The power management module 141 is configured to connect the battery 142 and the charging management module 140 to the processor 110.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G, 3G, 4G, 5G, and the like.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal.

The wireless communications module 160 may provide a solution, applied to the electronic device 100, to wireless communication including a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTF), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video.

The NPU is a neural-network (neural-network, NN) computing processor, quickly processes input information by referring to a structure of a biological neural network, for example, by referring to a mode of transfer between human brain neurons, and may further continuously perform self-learning. The electronic device 100 may implement applications such as intelligent cognition through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications of the electronic device 100 and data processing. The internal memory 121 may include a program storage area and a data storage area. The program storage area may store an operating system, in application required by at least one function (for example, a voice playing function or an image playing function), and the like. The data storage area may store data (such as audio data and a phone book) and the like created when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

The pressure sensor 180A is configured to sense a pressure signal, and can convert the pressure signal into an electrical signal.

The gyroscope sensor 180B may be configured to determine a motion posture of the electronic device 100. In some embodiments, an angular velocity of the electronic device 100 around three axes (namely, axes x, v, and z) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 can detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect a magnitude of an acceleration of the electronic device 100 in each direction (usually, on three axes). When the electronic device 100 is still, the acceleration sensor may detect magnitude and a direction of gravity. The acceleration sensor may be further configured to identify a posture of the electronic device, and is used in an application such as switching between a landscape mode and a portrait mode or a pedometer.

The distance sensor 180F is configured to measure a distance.

The optical proximity sensor 180G may include, for example, alight emitting diode (LED) and an optical detector. The ambient light sensor 180L is configured to sense luminance of ambient light.

The fingerprint sensor 180H is configured to collect a fingerprint.

The temperature sensor 180J is configured to detect a temperature.

The touch sensor 1801K is also referred to as a touch panel. The touch sensor 180K may be disposed on the display 194, and the touch sensor 180K and the display 194 constitute a touchscreen, which is also referred to as a "touch screen".

The bone conduction sensor 180M may obtain a vibration signal. In some embodiments, the bone conduction sensor 180M may obtain a vibration signal of a vibration bone of a human vocal-cord part.

The button 190 includes a power button, a volume button, and the like.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
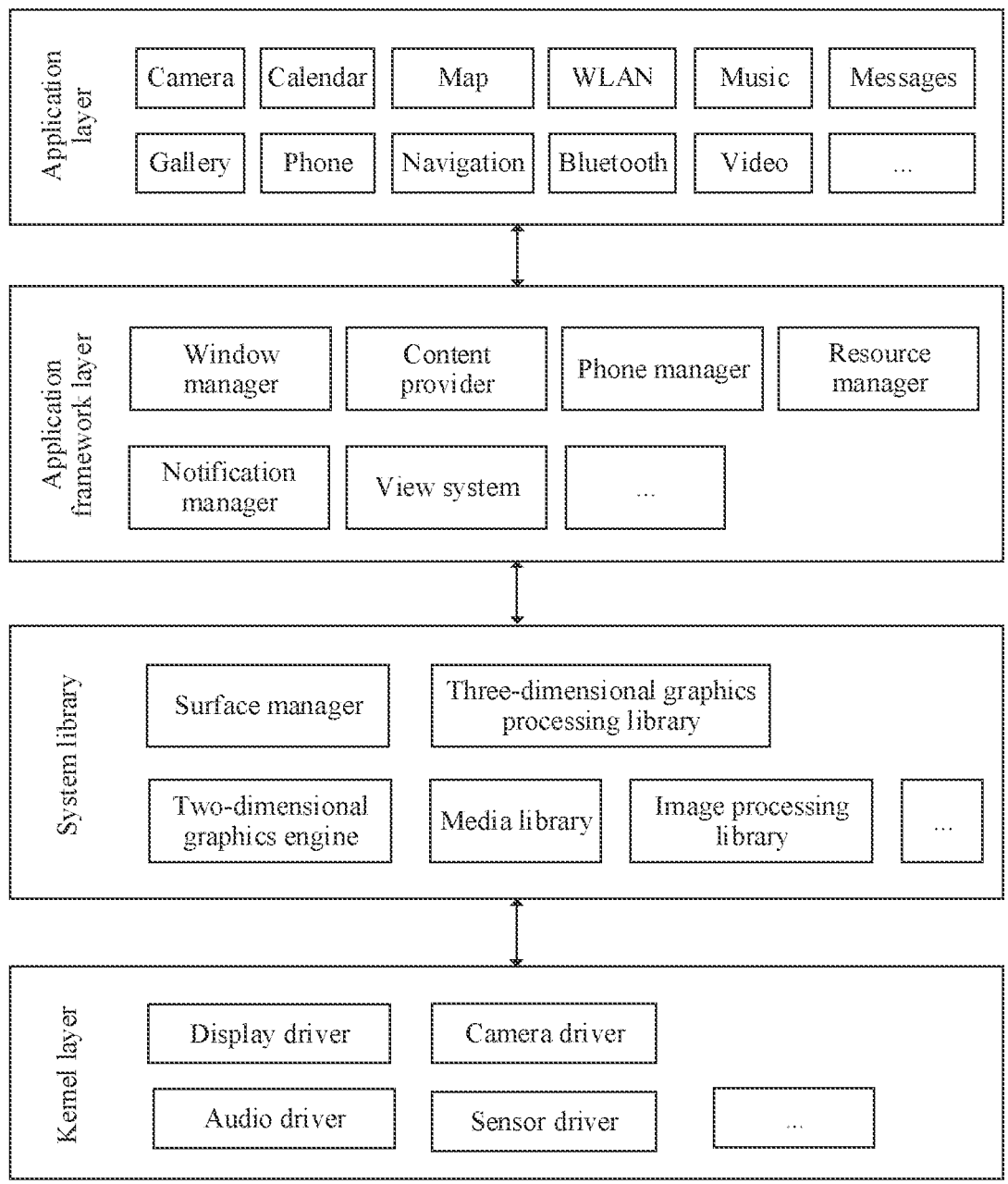
FIG. 2 is a block diagram of a software structure of an electronic device according to an embodiment of this application.

FIG. 2 is a block diagram of the software structure of the electronic device 100 according to an embodiment of this application. In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, an alert sound is played, the electronic device vibrates, or an indicator blinks.

The Android runtime includes a kernel library and a virtual machine. The Android runtime is responsible for scheduling and management of the Android system.

The core library includes two parts: a function that needs to be invoked in java language, and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media libraries), a three-dimensional graphics processing library (for example, an OpenGL ES), and a two-dimensional (MI graphics engine (for example, an SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG4, 1.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

FIG. 3(a) to FIG. 3(e) show a group of graphical user interfaces (graphical user interface, GUI) according to an embodiment of this application.

Figure 3A:
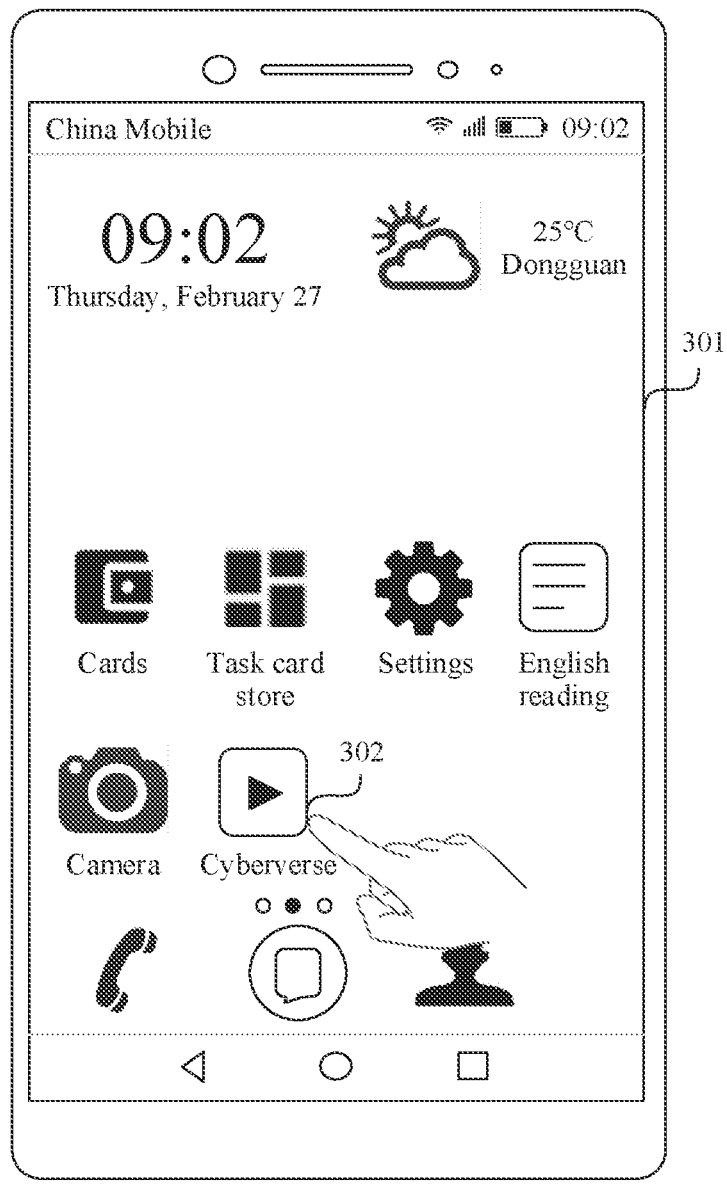
FIG. 3(a) to FIG. 3(e) are a group of GUIs according to an embodiment of this application.

As shown in FIG. 3(a), a GUI is a desktop of a mobile phone. The desktop 301 of the mobile phone may include a plurality of applications (application, App). The plurality of applications may include a Cyberverse application. After detecting an operation of tapping an icon 302 of the Cyberverse application by a user, the mobile phone may display a GUI shown in FIG. 3(b).

Figure 3B:
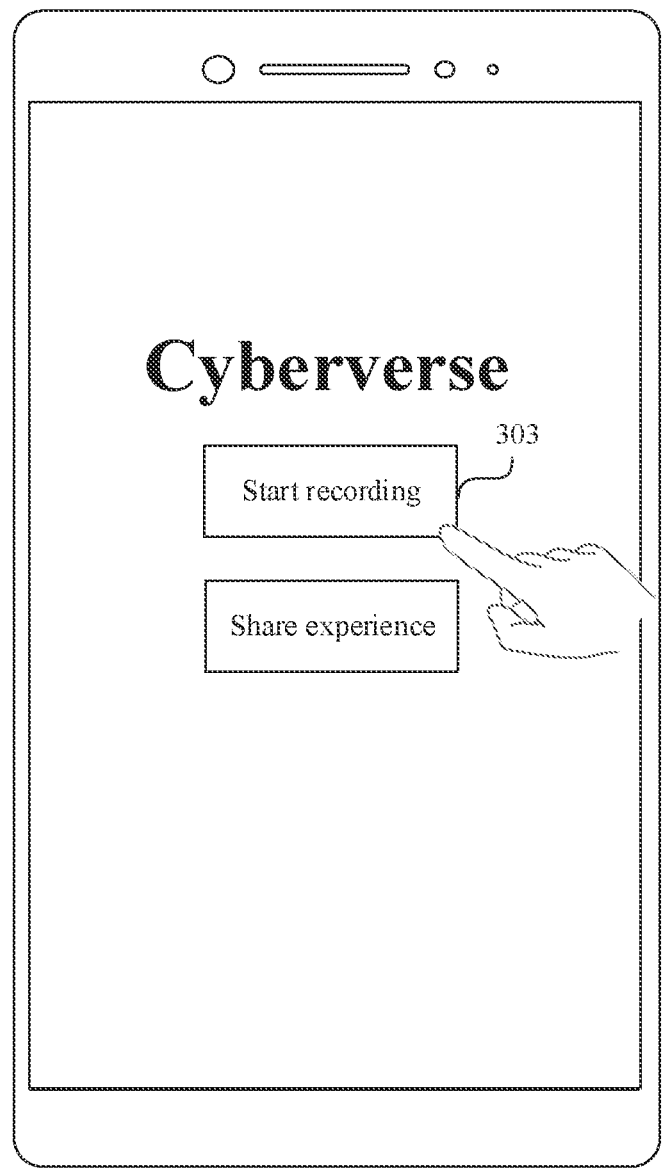

Refer to a GUI shown in FIG. 3(b). The GUI is a display interface of the Cyberverse application. The display interface includes two functions: "Start recording" and "Share experience". After the mobile phone detects an operation that the user taps a control 303 corresponding to the "Start recording" function, the mobile phone may display a GUI shown in FIG. 3(c).

Figure 3C:
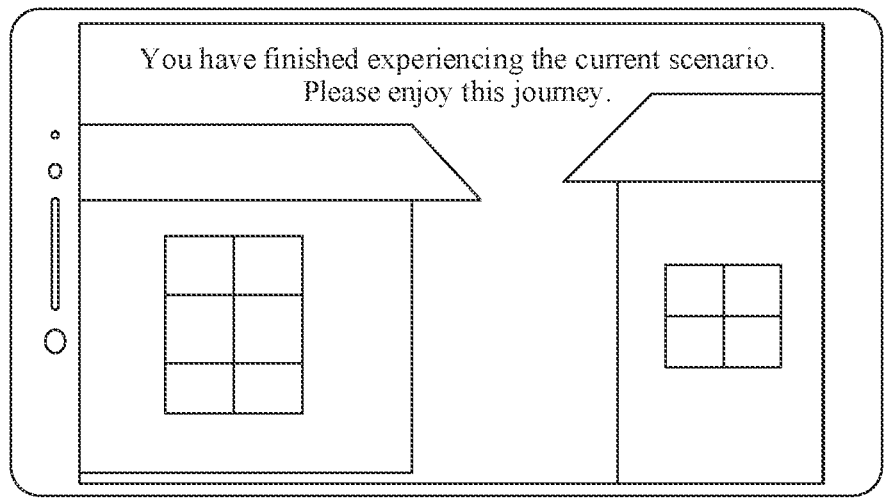

Refer to the GUI shown in FIG. 3(c). The GUI is a user experience interface of the Cyberverse application. The user experience interface may include prompt information and image information collected by a camera of the mobile phone. The prompt information is used to prompt the user of "The current scenario has been scanned. Please start to enjoy this journey". The image information may include an image photographed by the user Lee in the Huawei Songshan lake research center by using the mobile phone.

In this embodiment of this application, that the mobile phone scans the current scenario may mean that the mobile phone sends location information of the current mobile phone, data obtained by a sensor of the mobile phone, a framed image of a camera of the mobile phone, and the like to a cloud server. After receiving the information sent by the mobile phone, the cloud server may determine current pose data (including the location information and a camera posture) of the mobile phone based on the information sent by the mobile phone. The cloud server may store a digital world, and the data world may have a 1:1 relationship with the real world. After determining the location of the mobile phone, the cloud server may send, to the mobile phone, information about a surrounding object at the current location of the cloud server. For example, the cloud server may send, to the mobile phone, digital signage (for example, a cafe or a supermarket) of a building at a current photographing location of the mobile phone and detailed information about the digital signage.

In this embodiment of this application, the digital world stored in the cloud server may include a 3D map, digital signage (for example, digital signage of buildings) and white model data of some objects on the 3D map. The mobile phone may upload location information (for example, GPS information) of the mobile phone to the cloud server when starting recording. Because the location information uploaded by the mobile phone has a relatively large error, the cloud server may determine, by using the location information uploaded by the mobile phone, that the mobile phone is currently located at the Songshan lake. In this case, the cloud server may first deliver some information about white model data and digital signage of a building, and a 3D object model (for example, a cartoon character) at the Songshan lake to the mobile phone.

Figure 3D:
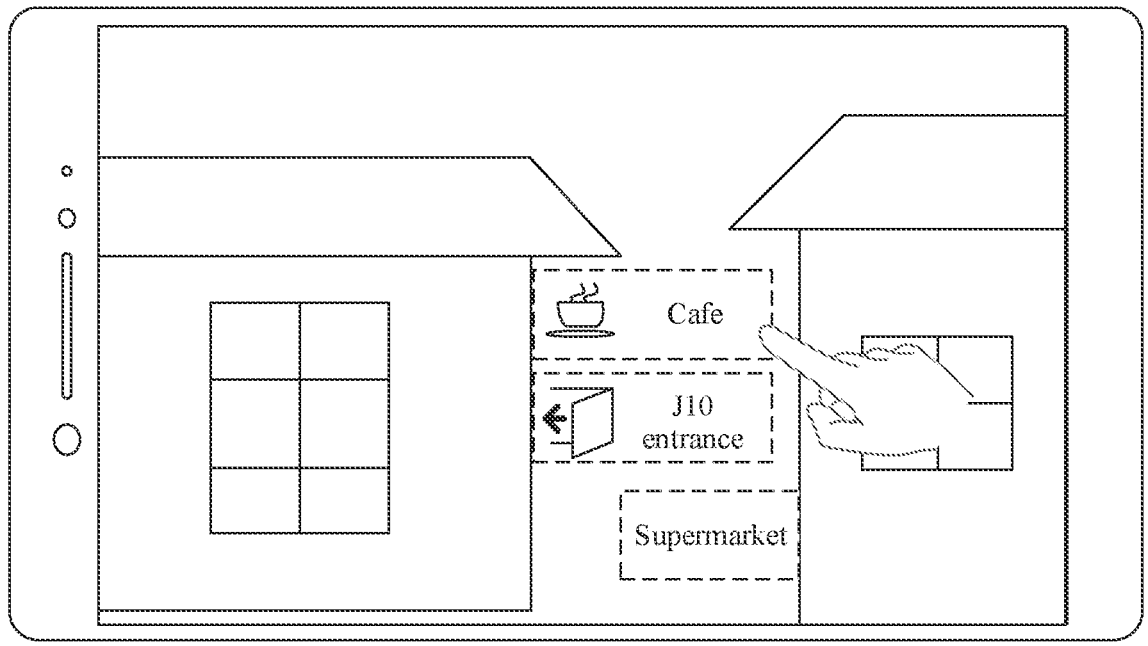

Refer to a GUI shown in FIG. 3(d). The GUI is a display interface experienced by the user. After obtaining the digital signage information sent by the cloud server, the mobile phone may display the information about the digital signage on the display interface in real time. As shown in FIG. 3(d), an image captured by the current camera includes two buildings. One building includes a "Cafe" and a "J10 entrance", and the other building includes a "Supermarket". If the user wants to view detailed information about the "Cafe", the user can click the corresponding digital signage. After detecting an operation that the user taps the "Cafe", the mobile phone may display a GUI shown in FIG. 3(e).

In this embodiment of this application, when the user starts to perform experience, the mobile phone may upload, to the cloud server, the image collected by the camera and the location information of the mobile phone. After receiving the image and the location information uploaded by the mobile phone, the cloud server may perform comparison based on the stored digital world, to determine a current accurate location of the mobile phone (an error is at a centimeter level). In addition, the mobile phone may further upload, to the cloud server, the image collected by the camera and the data collected by the sensor. The cloud server may determine a current orientation of the mobile phone through calculation. The cloud server sends, to the mobile phone, digital signage, white model data, and the like of an object in the image currently collected by the camera, so that the mobile phone can display, to the user by using a display, information about the object in the image collected by the camera, for example, the "Cafe", the "J10 entrance", and the "Supermarket" shown in FIG. 3(d).

Figure 3E:
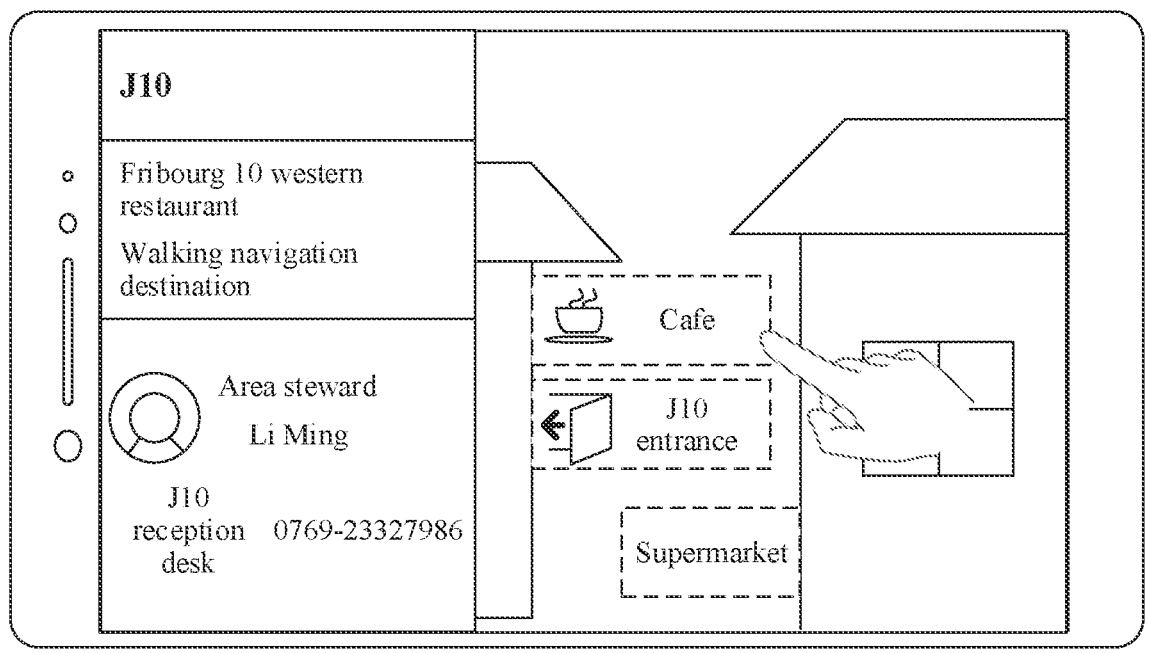

Refer to the GUI shown in FIG. 3(e). The GUI is another display interface experienced by the user. The display interface contains the detailed information about the "Cafe". The "Cafe" is located in Building Fribourg 10 (J10) western restaurant. An area steward of J10 is Li Ming, and a phone number of a J10 reception desk is 0769-23327986.

With reference to the group of GUIs shown in FIG. 3(a) to FIG. 3(e), the foregoing describes a process in which the user performs experience by using the Cyberverse application. The Cyberverse application can implement all-scenario spatial computing, enabling the mobile phone to calculate centimeter-level positioning of the mobile phone and seamlessly integrate the real world with the physical world. The Cyberverse application also has a strong environment understanding function, which greatly improves a capability of the mobile phone to accurately identify a physical environment and objects. An efficient and high-precision construction capability of the Cyberverse application can automatically extract ambient environment feature information, so that the mobile phone can accurately obtain 3D information about the surrounding world. In addition, the Cyberverse application has a super-realistic virtual-real fusion rendering capability, which makes a drawing effect more realistic.

The following describes another user experience process in the Cyberverse application by using another group of GUIs in FIG. 4(a) to FIG. 4(f).

Figure 4A:
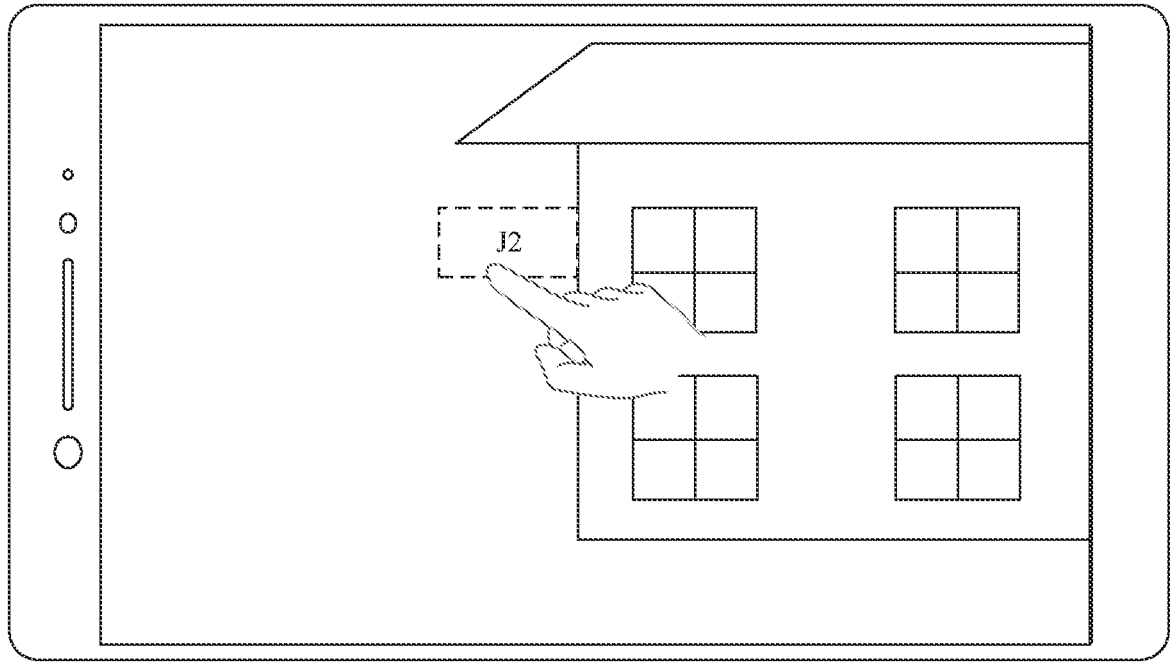
FIG. 4(a) to FIG. 4(f) are another group of GUIs according to an embodiment of this application.

Refer to a GUI shown in FIG. 4(a). The GUI is another display interface experienced by a user. The display interface includes a building, and digital signage of the building is J2. After a mobile phone detects an operation that the user taps the data signage "J2", the mobile phone may display a GUI shown in FIG. 4(b).

Figure 4B:
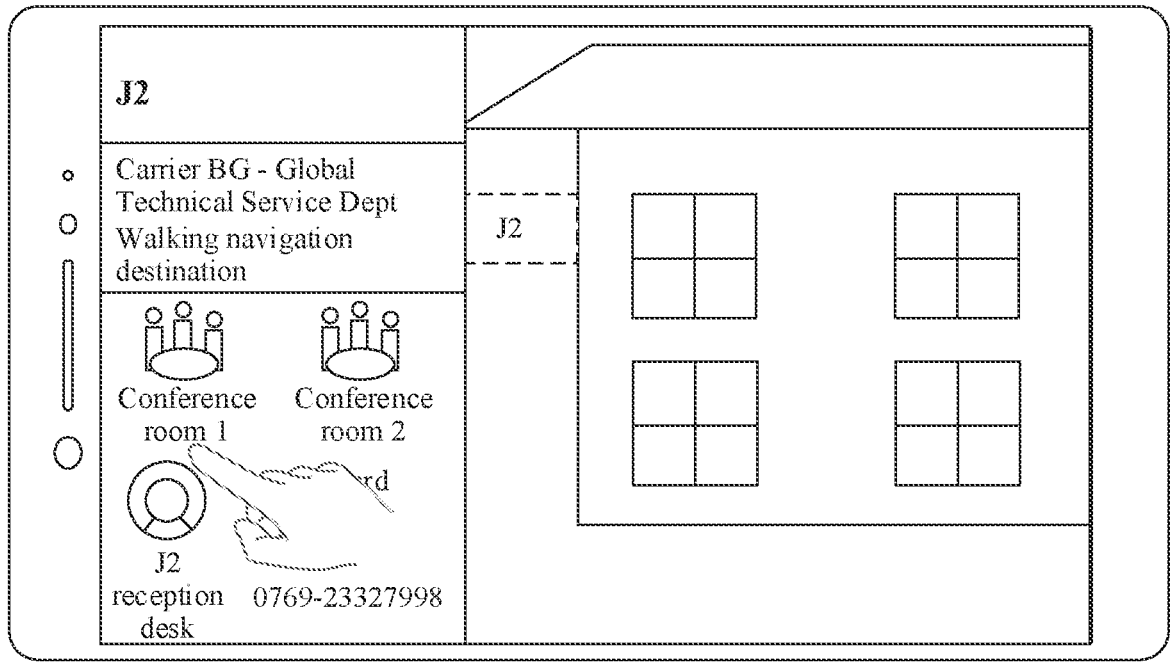

Refer to the GUI shown in FIG. 4(b). The GUI is another display interface experienced by the user. The display interface may include detailed description of the building J2. The detailed description includes that J2 is a department A. Destinations that can be navigated on foot include a conference room 1 and a conference room 2. An area steward of J2 is Zhang Hui, and a phone number of a J2 reception desk is 0769-23327998. If the user wants to navigate to the conference room 1, the user may tap the conference room 1. After detecting an operation of tapping the conference room 1 by the user, the mobile phone may display the GUI shown in FIG. 4(c).

Figure 4C:
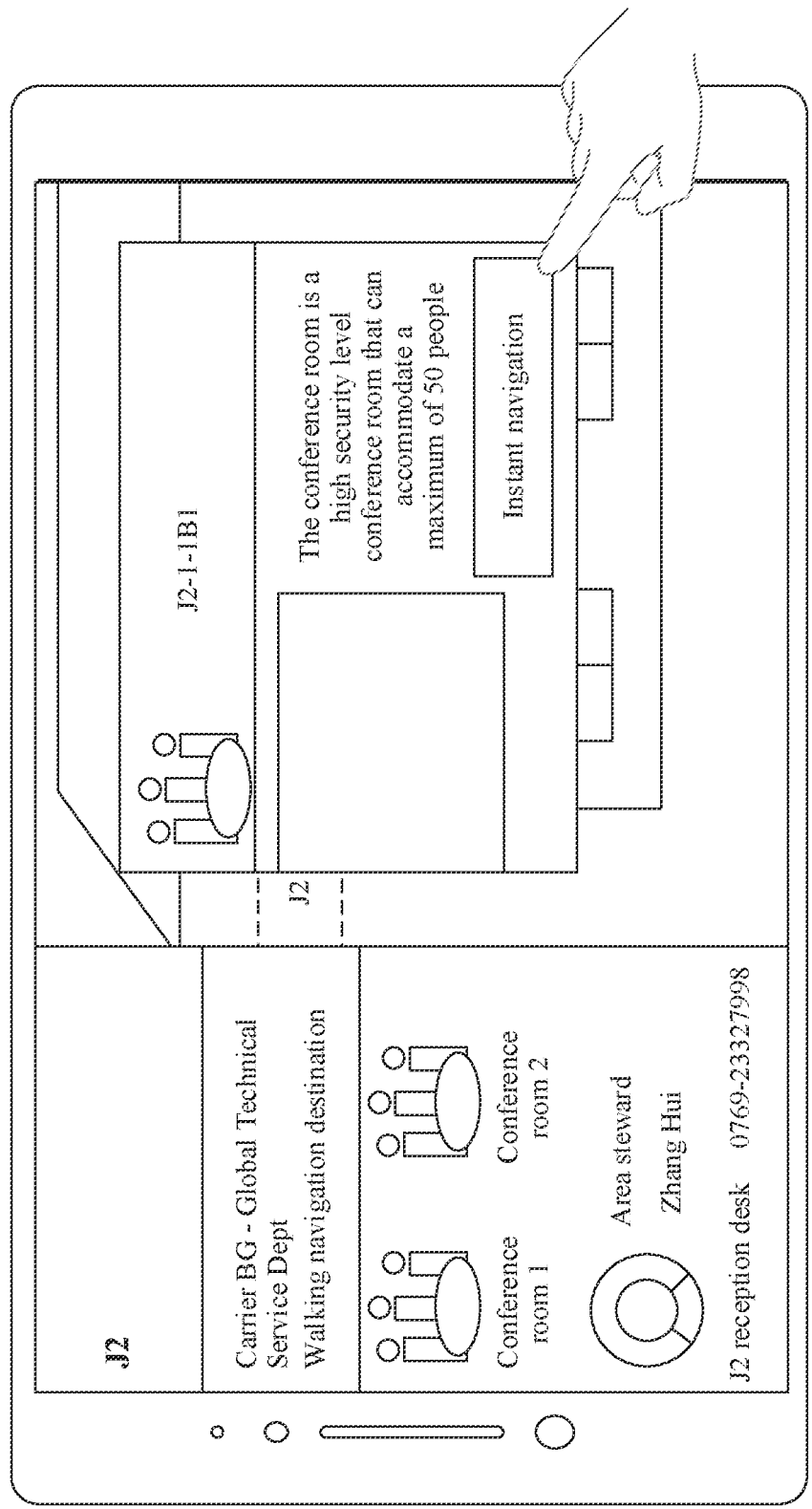

Refer to the GUI shown in FIG. 4(c). The GUI is another display interface experienced by the user. The display interface may include a specific description of the conference room 1. The conference room 1 is located at J2-1-1B1. The conference room 1 is a high security level conference room that can accommodate a maximum of 50 people. After detecting an operation that the user taps a control of "Instant navigation", the mobile phone may display a GUI shown in FIG. 4(d).

Figure 4D:
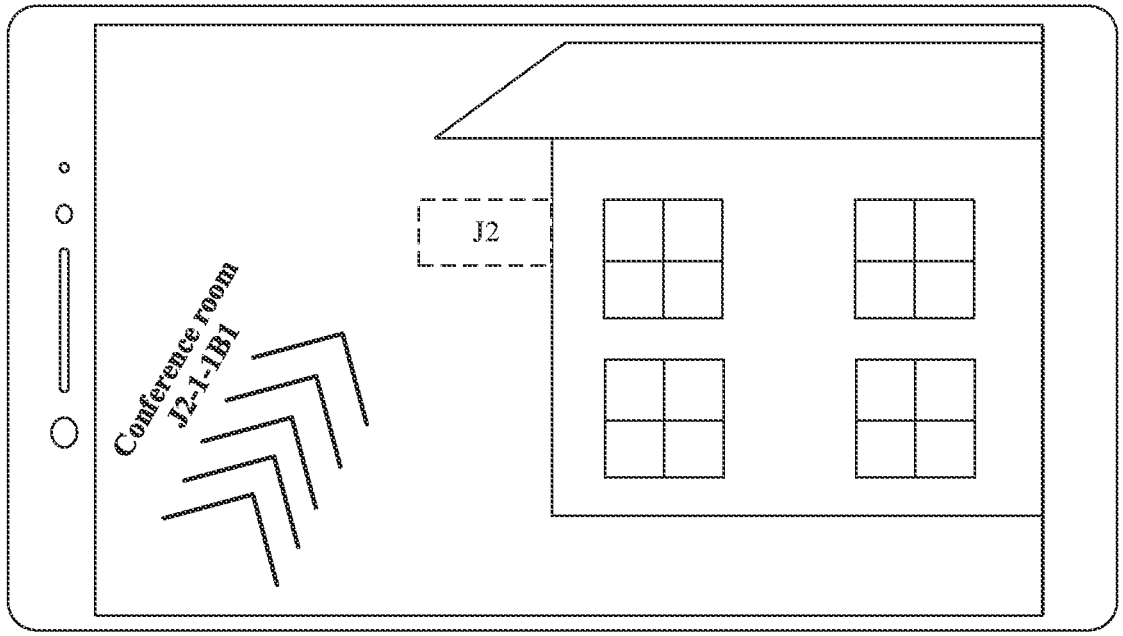

Refer to the GUI shown in FIG. 4(d). The GUI is a display interface for navigating to the conference room 1. The display interface may include a navigation arrow indication for navigating to the conference room 1. The user may go to the conference room 1 by following the navigation arrow.

Figure 4E:
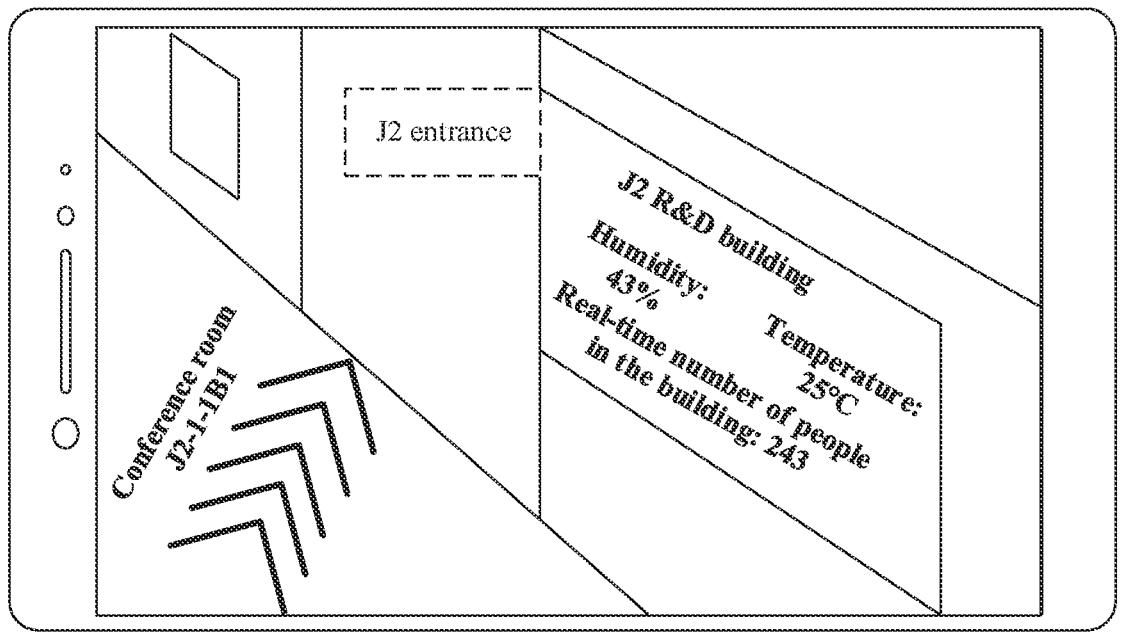

Refer to a GUT shown in FIG. 4(e). The GUI is another display interface for navigating to the conference room 1. When the user walks to a door of J2, in addition to displaying prompt information of the entrance of J2 and the navigation arrow indication of the conference room 1, the mobile phone may further obtain detailed information in the building J2 from the cloud server. For example, current humility of J2 is 43%, a temperature is 25° C., and a number of people in J2 is 243.

Figure 4F:
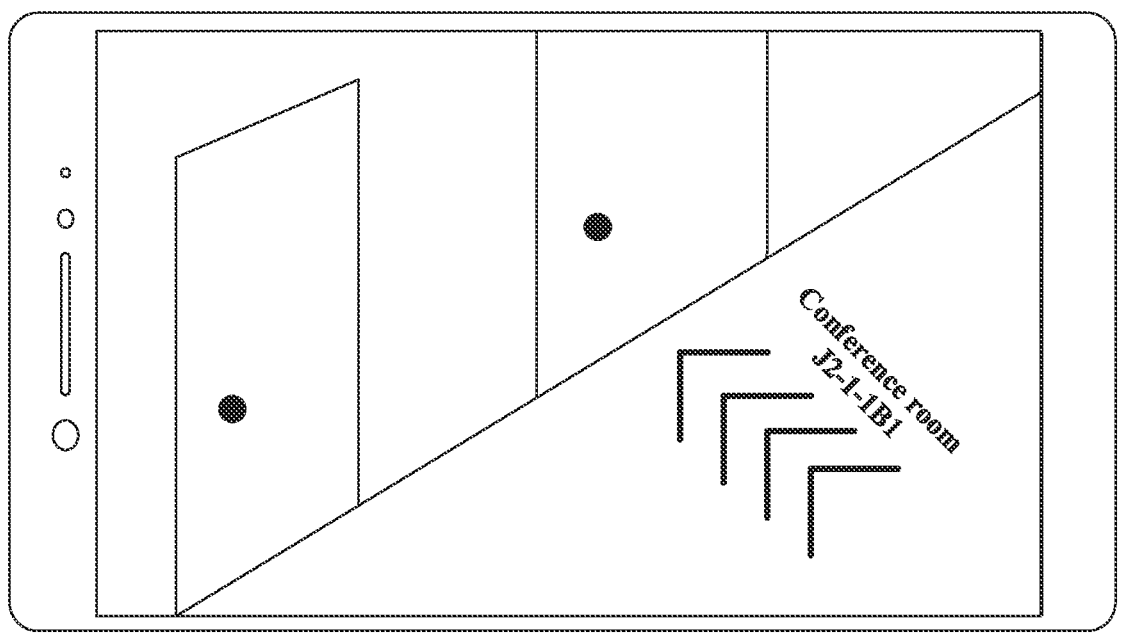

Refer to a GUI shown in FIG. 4(f). The GUI is another display interface for going to the conference room 1. FIG. 4(d) and FIG. 4(e) are outdoor navigation interfaces, and an indoor navigation interface is further provided in the Cyberverse application. As shown in FIG. 4(f), after the user enters the building J2, the navigation arrow indication may continue to be displayed, so that the user can accurately find a room at which the conference room 1 is located in J2.

With reference to the GUIs in FIG. 3(a) to FIG. 4(f), the foregoing describes a process of the user Lee's experience in the Songshan lake research center. When the user Lee ends the experience, the mobile phone may save the process of the user Lee's experience at the Songshan lake. The following describes a user experience sharing process with reference to FIG. 5(a) to FIG. 5(f).

Figure 5A:
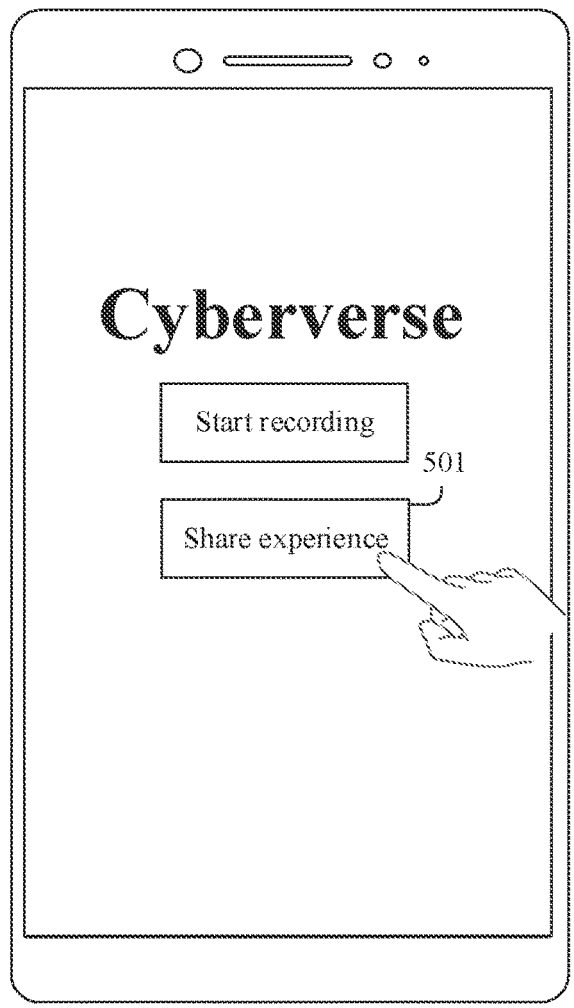
FIG. 5(a) to FIG. 5(f) are still another group of GUIs according to an embodiment of this application.

As shown in FIG. 5(a), a GUI is a display interface of a Cyberverse application. The display interface includes a control 501 for sharing experience. After detecting an operation of tapping the control 501 by a user, a mobile phone may display a GUI shown in FIG. 5(b).

Figure 5B:
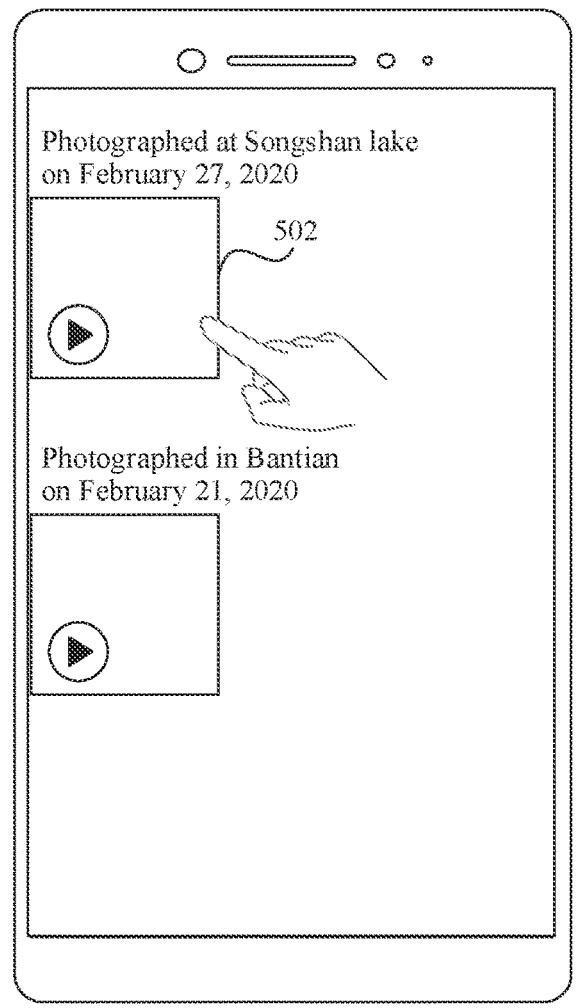

As shown in FIG. 5(b), the GUI is experience data stored in the mobile phone, including experience data 502 photographed at the Songshan lake on Feb. 27, 2020 and experience data photographed in Bantian on Feb. 21, 2020. After detecting an operation of touching and holding the experience data 502 by the user, the mobile phone may display a GUI shown in FIG. 5(c).

Figure 5C:
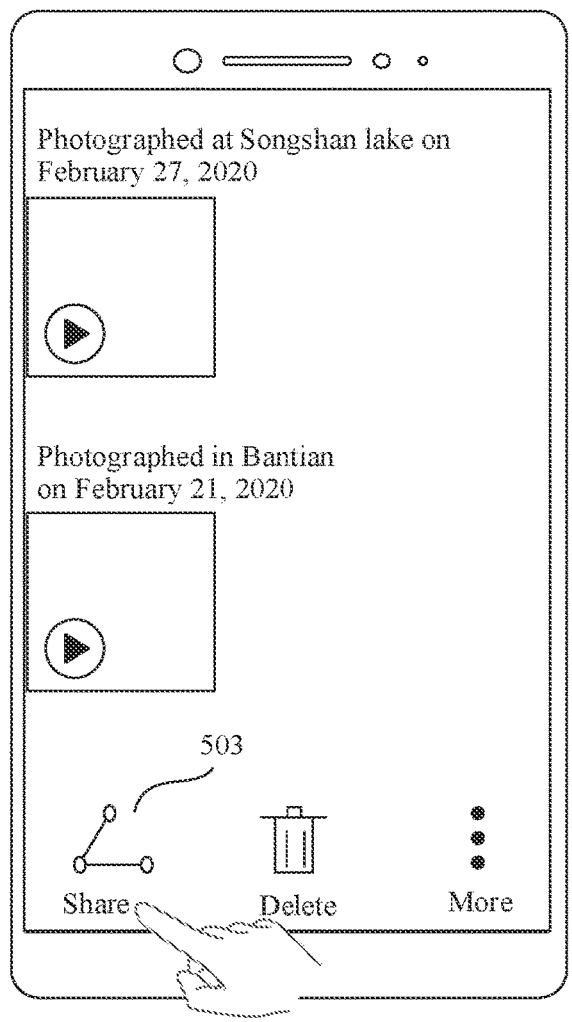

Refer to the GUI shown in FIG. 5(c). The GUI is an operation interface experienced by the user. The operation interface may include functions such as "Share" and "Deletion". After detecting an operation that the user taps a "Share" control 503, the mobile phone may display a GUI shown in FIG. 5(d).

Figure 5D:
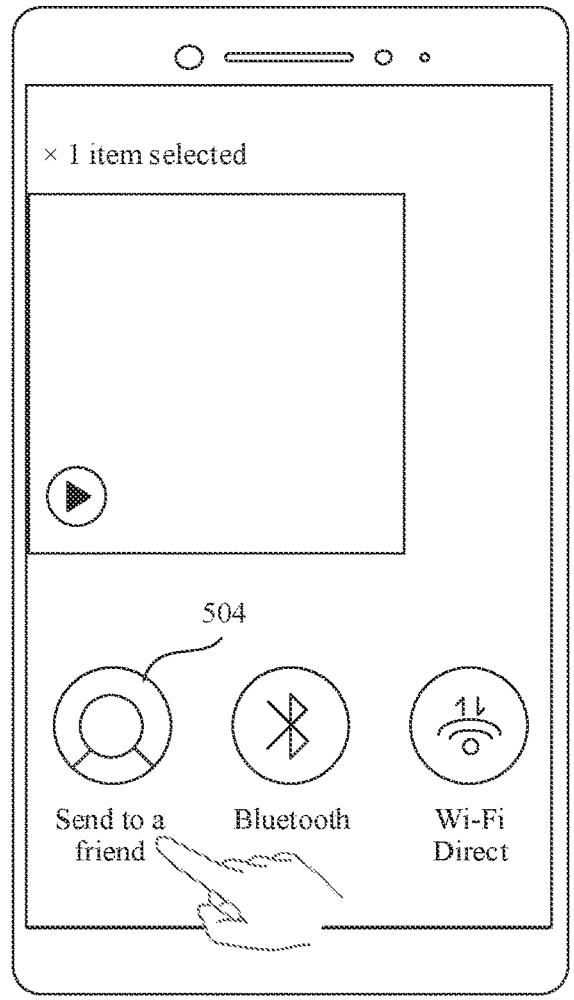

Refer to the GUI shown in FIG. 5(d). The GUI is a user experience shaming interface. The sharing interface includes functions such as "Send to a friend", "Bluetooth", and "WLAN Direct". After detecting an operation that the user taps a control 504, the mobile phone may display a GUI shown in FIG. 5(e).

Figure 5E:
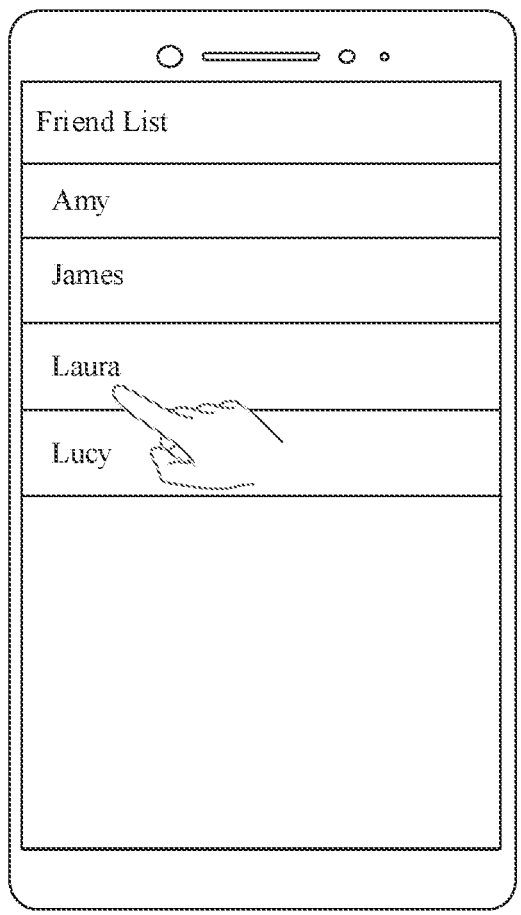

Refer to the GUI shown in FIG. 5(e). The GUI is a friend list display interface of the user Lee. A friend list of the user Lee contains friends Amy, James, Laura, and Lucy. After detecting an operation that the user taps the friend Laura, the mobile phone may display a GUI shown in FIG. 5(f).

Figure 5F:
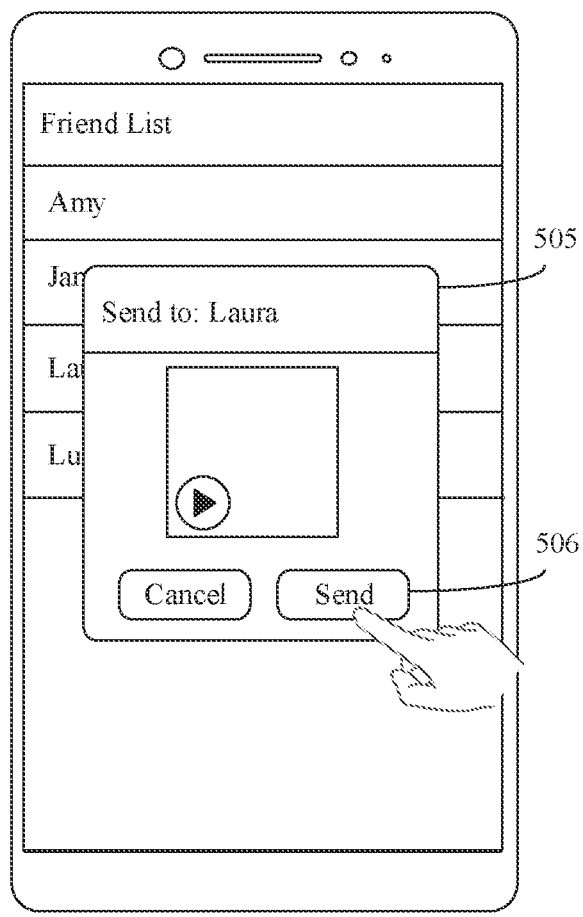

Refer to FIG. 5(f). The GUI is a sharing interface of user experience. The sharing interface includes a reminder box 505. The reminder box 505 may prompt the user that a sending object of user experience is Laura, and sent experience data is the experience data of the user Lee in the Songshan lake research center. After the mobile phone detects an operation of tapping a control 506 by the user, the mobile phone may send the user experience to Laura.

It should be understood that the foregoing is merely sending the user experience to another user in a manner of social software. The user Lee can alternatively send the user experience to a friend through an email, an SMS message, Bluetooth, and WLAN Direct.

With reference to FIG. 6(a) to FIG. 10(e), the following describes a process in which the user Laura enjoys an immersive experience by using a mobile phone of the user Laura after receiving the user experience sent by the user Lee.

Figure 6A:
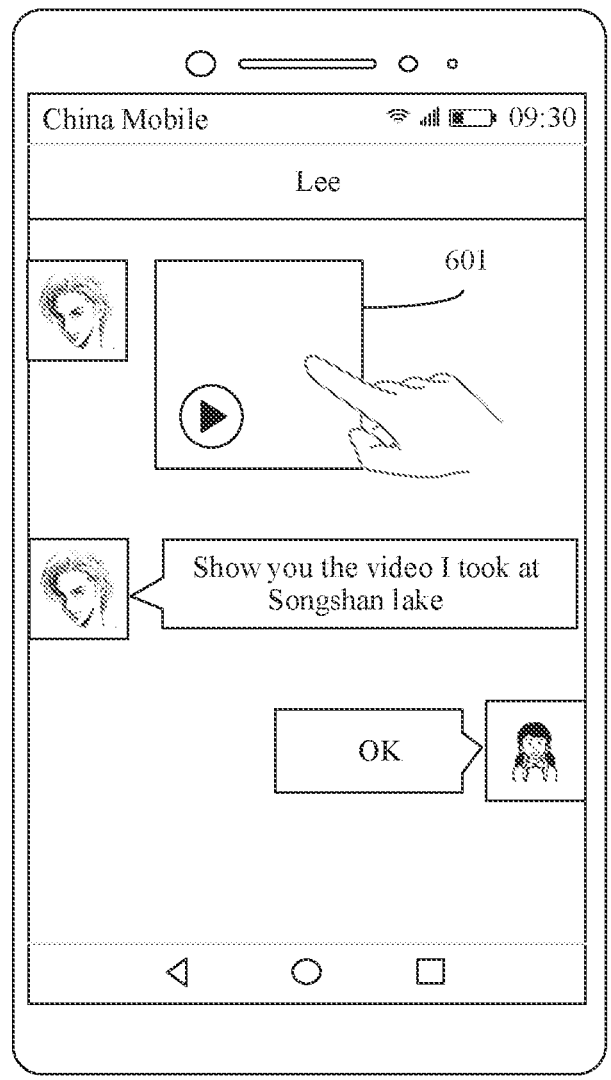
FIG. 6(a) to FIG. 6(c) are yet another group of GUIs according to an embodiment of this application.

Refer to a GUI shown in FIG. 6(a). The GUI is a chat interface between the user Laura and the user Lee. The user Laura receives the user experience sent by the user Lee through a social app. After detecting an operation of touching and holding user experience data 601 by the user Laura, the mobile phone may display a GUI shown in FIG. 6(b).

Figure 6B:
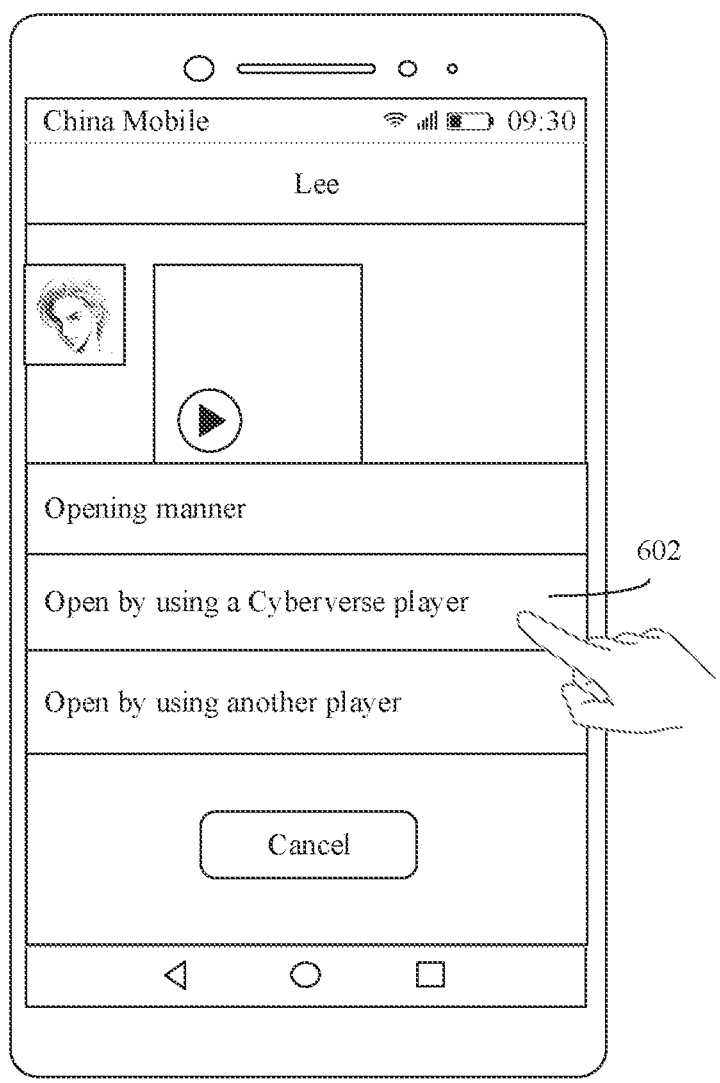

Refer to the GUI shown in FIG. 6(b). The mobile phone may further prompt the user that an opening manner of the user experience includes "Open by using a Cyberverse player" or "Open by using another player" After detecting an operation that the user taps a control 602 of "Open by using the Cyberverse player, the mobile phone may display a GUI shown in FIG. 6(c).

Figure 6C:
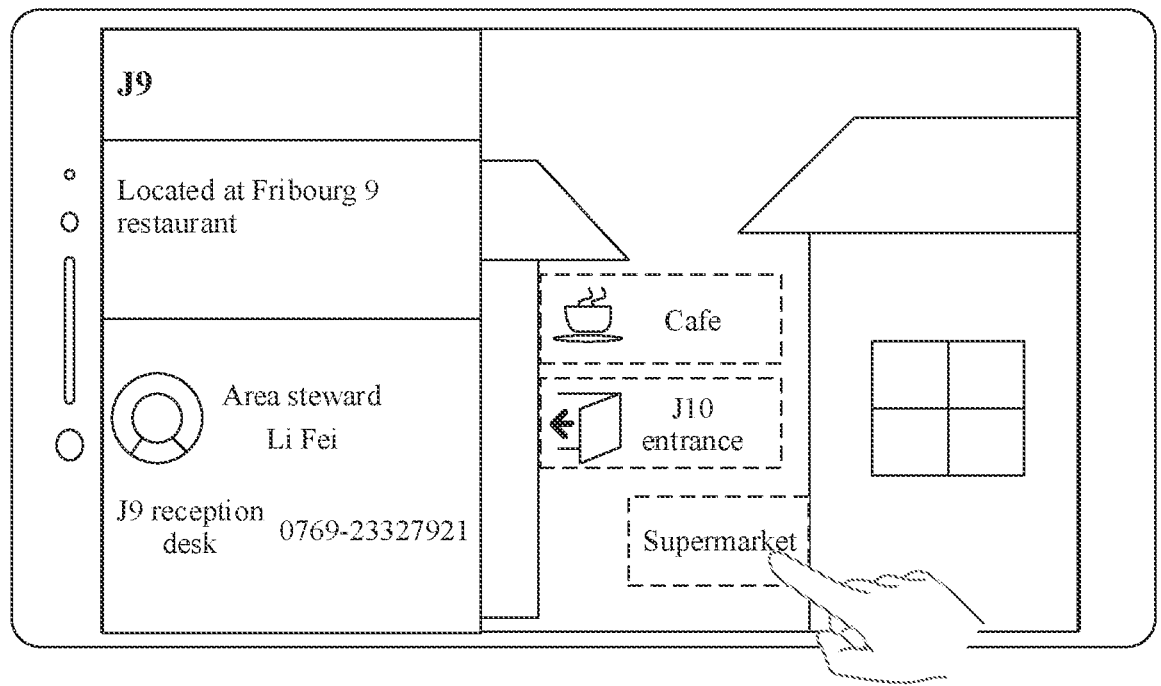

Refer to the GUI shown in FIG. 6(c). The GUI is a display interface of the immersive experience process performed by the user Laura. The interface shown in FIG. 6(c) is that the user Laura can see, on the current display interface, a first frame image photographed by the user Lee in the Songshan lake research center and digital signage information of the building on the image. After the mobile phone detects in operation that the user Laura taps the digital signage "Supermarket", the mobile phone may display detailed information about the "Supermarket". The supermarket is located at a Fribourg 9 (J9) restaurant. An area steward of J9 is Li Fei, and a phone number of a J9 reception desk is 0769-23327921.

Figure 7:
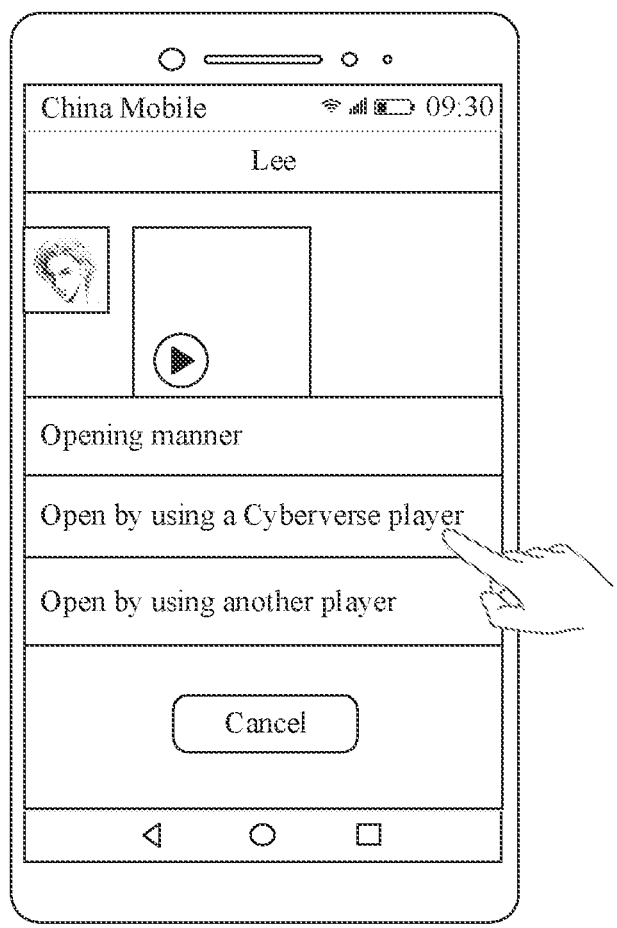
FIG. 7 is still yet another group of GUIs according to an embodiment of this application.
Figure 7:
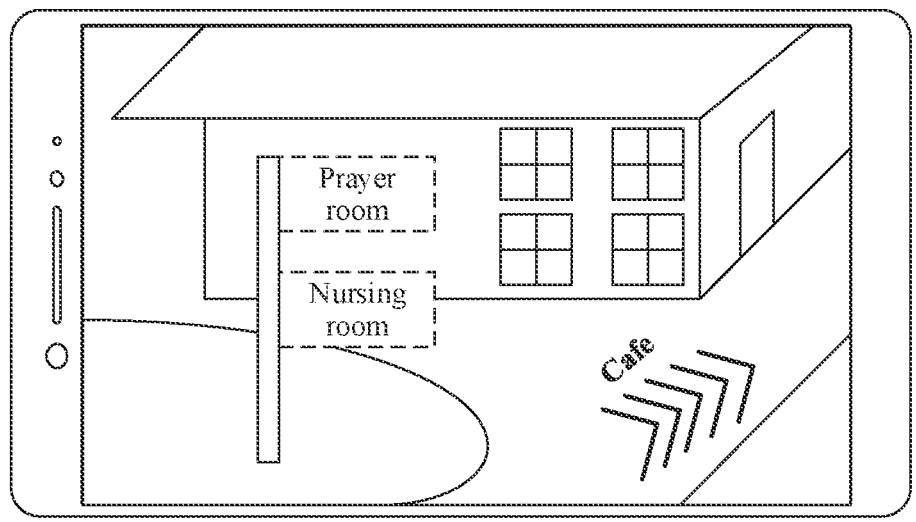

FIG. 7 shows another group of GUIs according to an embodiment of this application.

Refer to the GUI shown in (a) in FIG. 7. After detecting an operation that the user taps "Open by using the Cyberverse player", the mobile phone may display a GUI shown in (b) in FIG. 7.

Refer to the GUI shown in (b) in FIG. 7. The GUI is a display interface of the immersive experience process performed by the user Laura, Compared with that in FIG. 6(c), a first frame of image when the user Laura starts to enjoy the immersive experience may be a first frame of image when the user Lee enjoys the immersive experience. In (b) in FIG. 7, the first frame of image when the user Laura starts to enjoy the immersive experience may alternatively be a frame of image in a process in which the user Lee enjoys the immersive experience.

In this embodiment of this application, the mobile phone may start displaying from the first frame of image experienced by the user, or may start displaying from a frame of image experienced by the user.

In an embodiment, the mobile phone may also prompt the user Laura to select a frame of image in the user experience process to start experience.

Figure 8A:
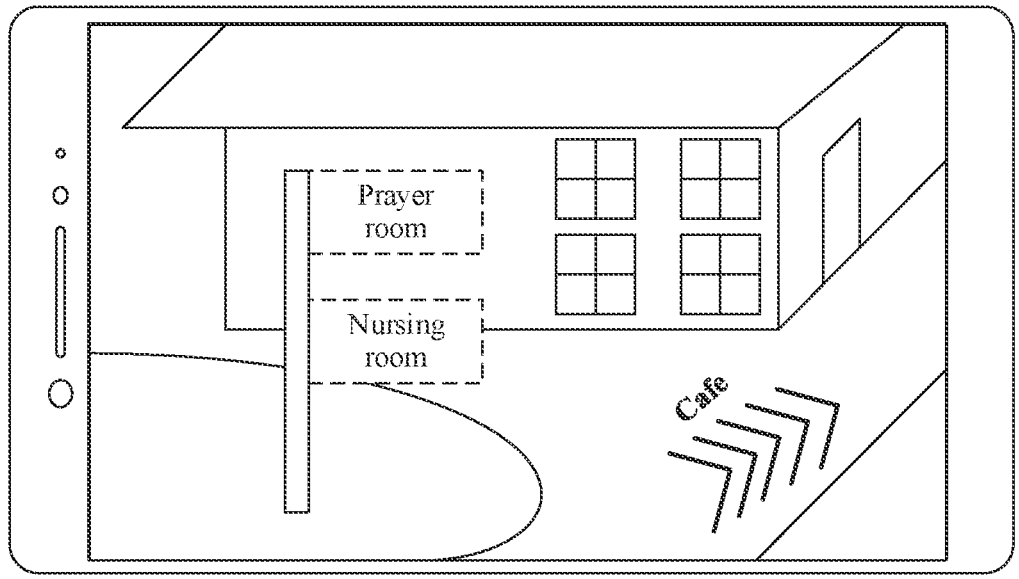
FIG. 8(a) and FIG. 8(b) are a further group of GUIs according to an embodiment of this application.
Figure 8A:
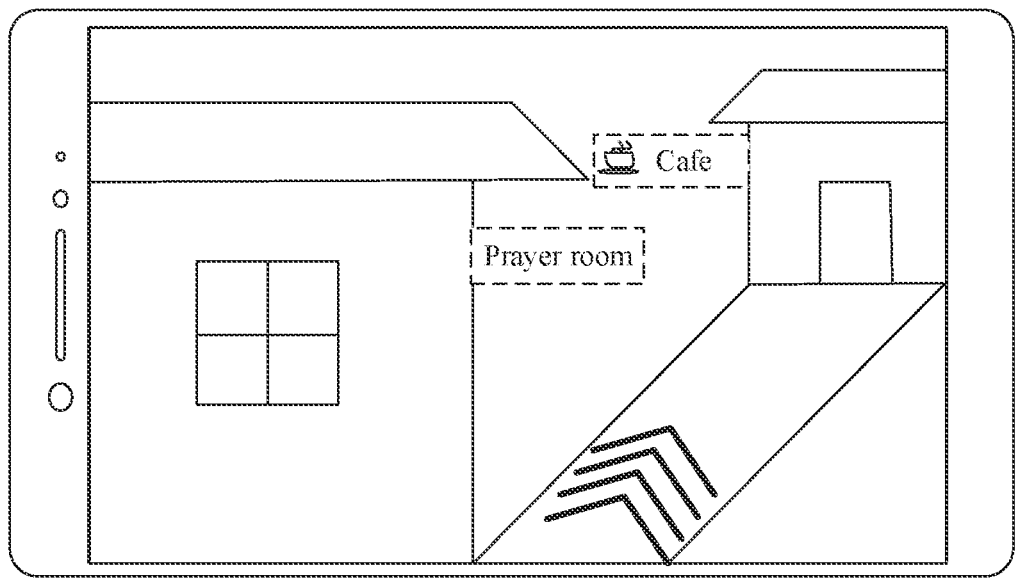
Figure 8B:
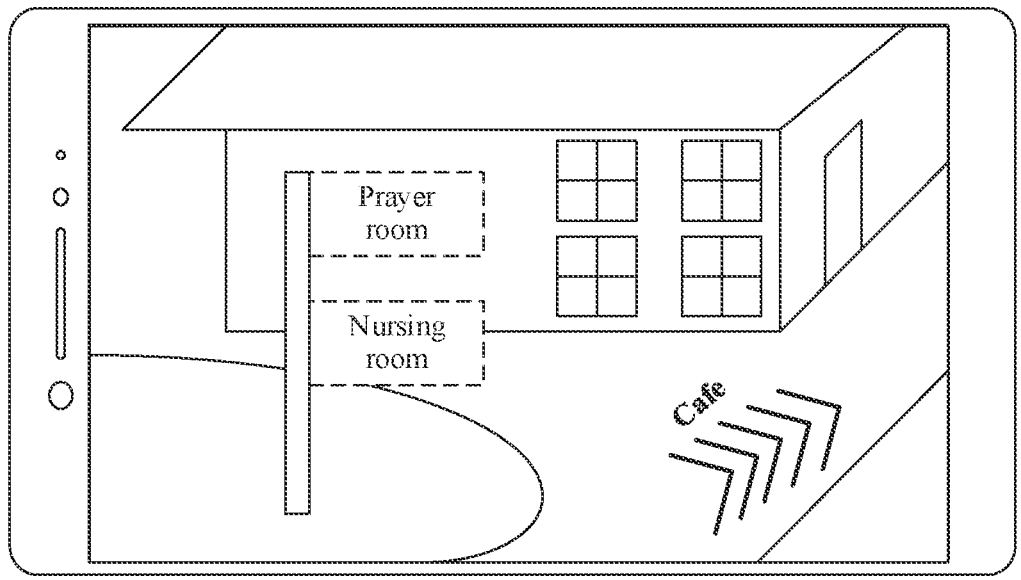
Figure 8B:
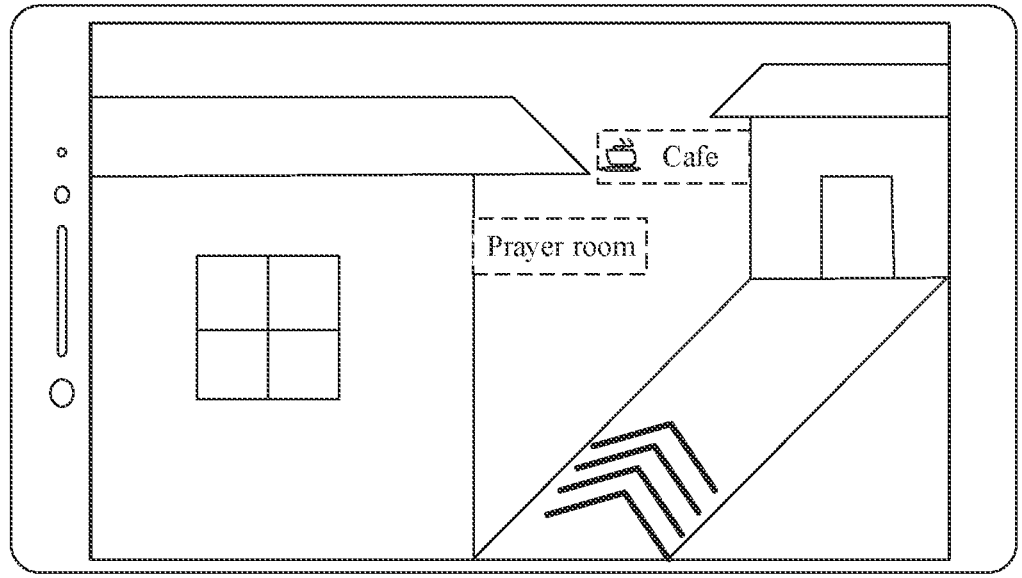

FIG. 8(a) and FIG. 8(b) show another group of GUIs according to an embodiment of this application.

Refer to the GUI shown in FIG. 8(a). The GUI is a process in which the user Lee enjoys an immersive experience in the Songshan lake research center. After the user Lee walks 10 meters northeast from a current location during Songshan research center photographing, digital signage of a "Prayer room" and a "Cafe" appears on the display interface of the mobile phone.

Refer to a GUI shown in FIG. 8(b). The GUI is a process in which the user Laura enjoys an immersive experience at home. After the user Laura walks 10 meters northeast along a current location at home, the digital signage of the "Prayer room" and the "Cafe" appears on the display interface of the mobile phone.

In this embodiment of this application, a file saved after Cyberverse experience may be played back by using the Cyberverse player. By combining an operation performed by the user on an existing device, the user not only can view video information in the file, but also can enjoy an interactive immersive experience in the player.

Figure 9:
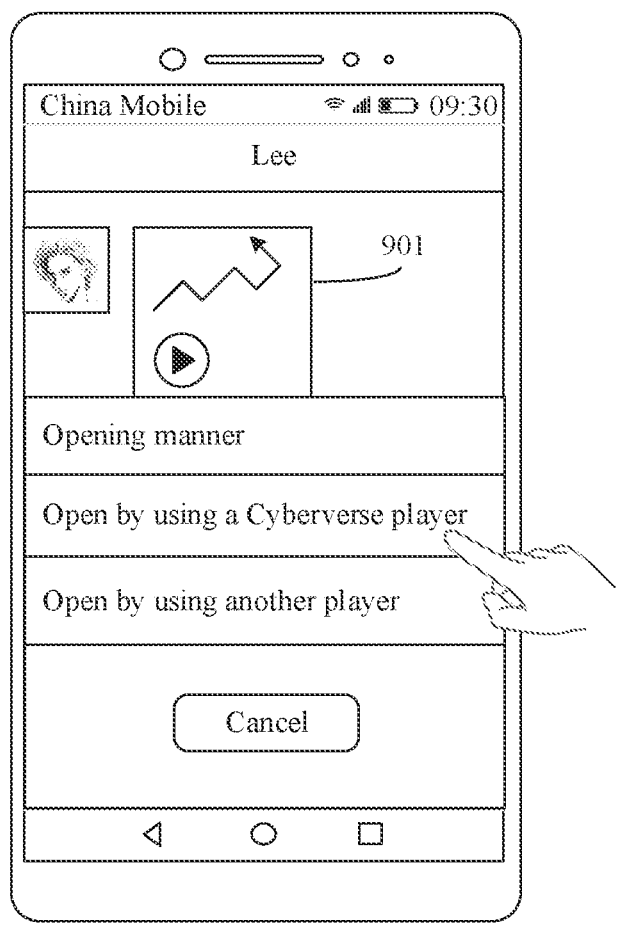
FIG. 9 is a still further group of GUIs according to an embodiment of this application.
Figure 9:
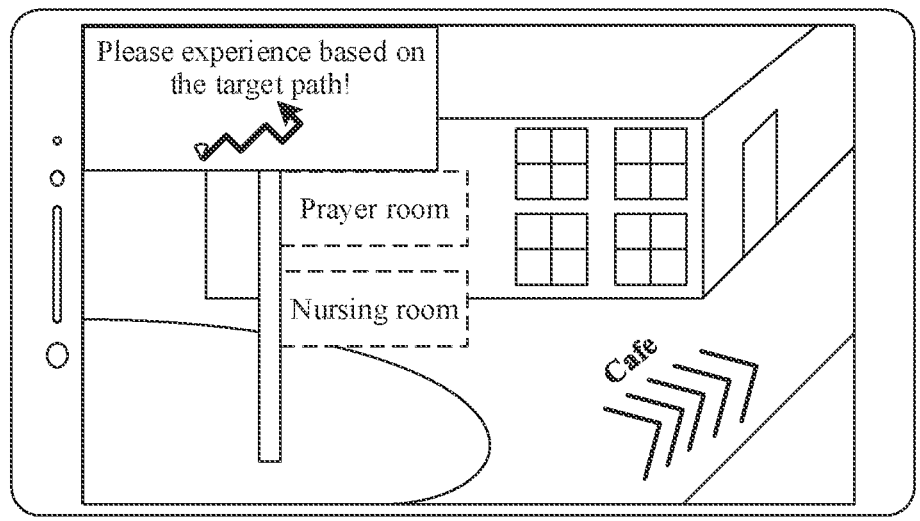

FIG. 9 shows another group of GUIs according to an embodiment of this application.

Compared with that in FIG. 6(a), FIG. 6(b), and (a) in FIG. 7, user experience data 901 in a GUI shown in (a) in FIG. 9 may further include path information of a user Lee in an experience process. After detecting an operation that the user taps a control of "Open by using a Cyberverse player", the mobile phone may display a GUI shown in (b) in FIG. 9.

Refer to the GUI shown in (b) in FIG. 9. Compared with the GUI shown in (b) in FIG. 7, the GUI further includes prompt information "Please perform experience based on the target line!", and the target line. The target line is a walking path of the user Lee when the user Lee performs experience in the Songshan lake research center. After seeing the target line, the user Laura may perform experience at home according to the target line. Because the user Laura may view information about the target line on the display interface, the user Laura may perform experience according to the target line.

FIG. 10(a) to FIG. 10(e) show another group of GUIs according to an embodiment of this application.

Figure 10A:
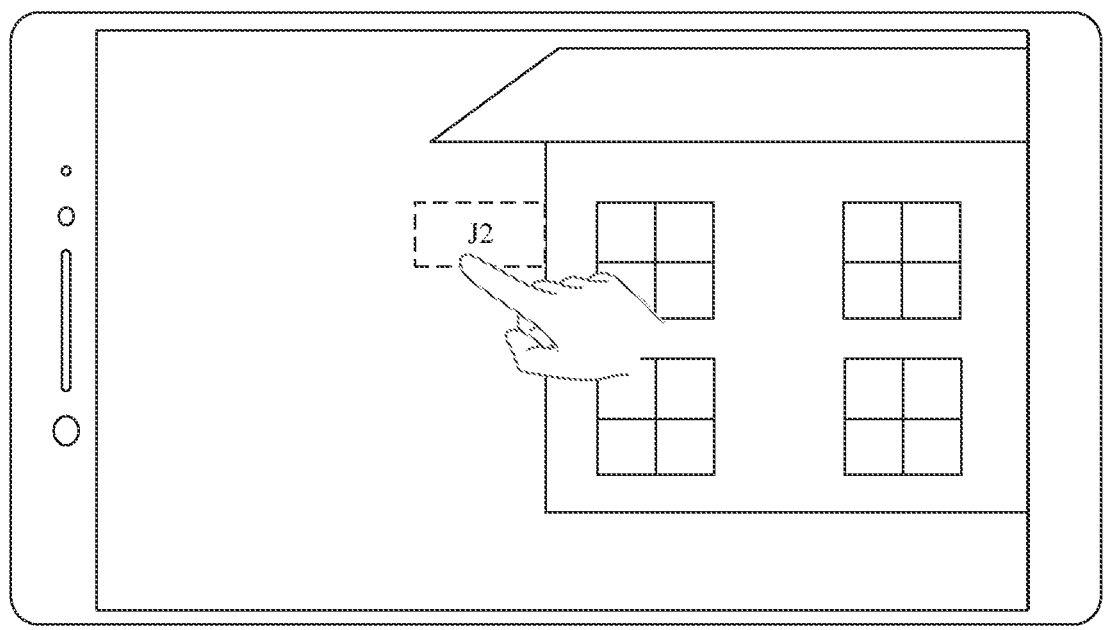
FIG. 10(a) to FIG. 10(e) are a yet further group of GUIs according to an embodiment of this application.

Refer to a GUI shown in FIG. 10(a). After detecting an operation that a user Laura taps digital signage "J2" of the building, the mobile phone may display a GUI shown in FIG. 10(b).

Figure 10B:
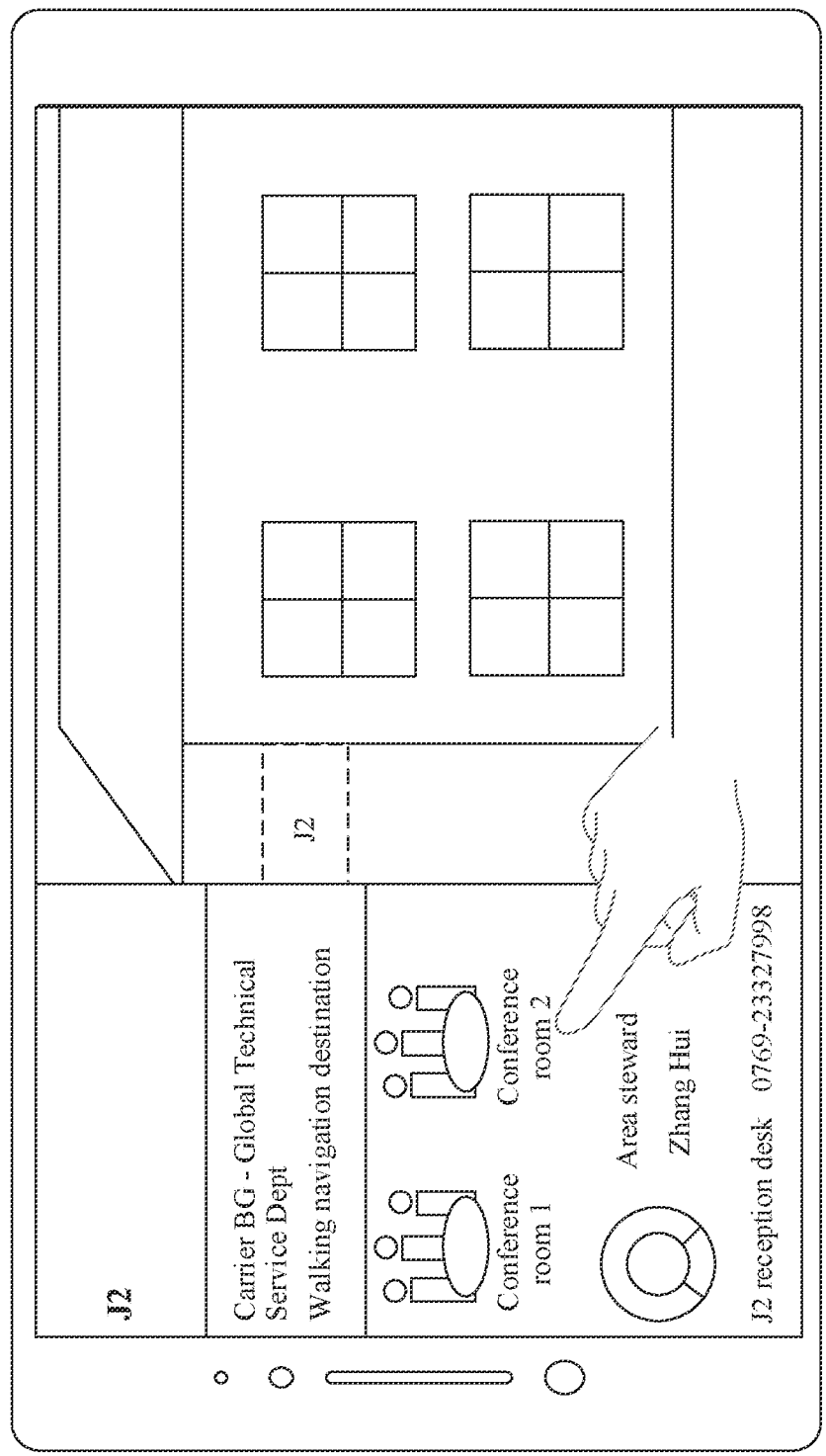

Refer to the GUI shown in FIG. 10(b). The GUI is another display interface experienced by the user. The display interface may include detailed description of the building J2. The detailed description includes that J2 is a department A. Destinations that can be navigated on foot include a conference room 1 and a conference room 2. An area steward of J2 is Zhang Hui, and a phone number of a J2 reception desk is 0769-23327998. If the user Laura wants to navigate to the conference room 2, the user Laura may click the conference room 2. After detecting an operation of tapping the conference room 2 by the user, the mobile phone may display a GUI shown in FIG. 10(c).

Figure 10C:
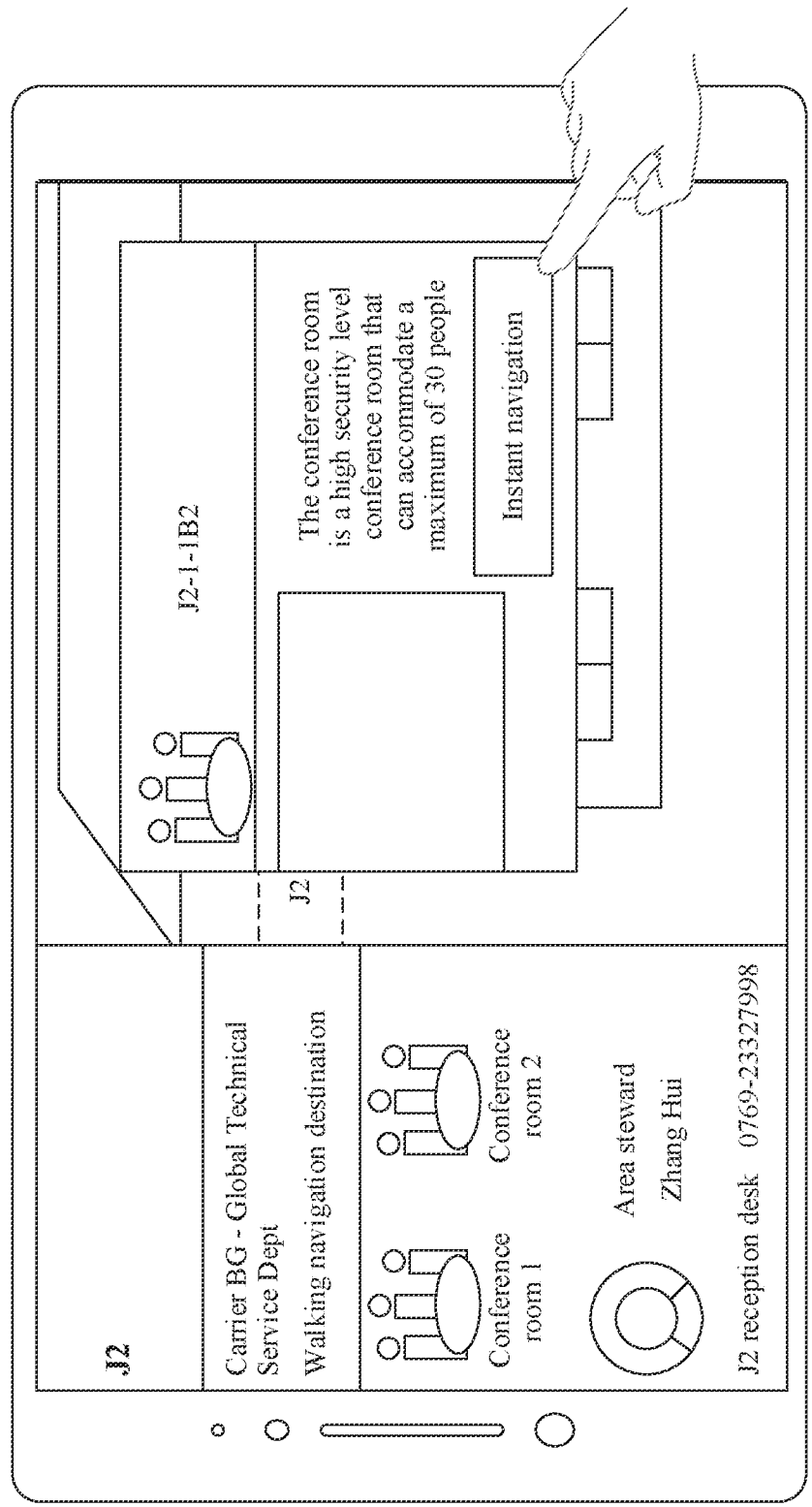

Refer to the GUI shown in FIG. 10(c). The GUI is another display interface experienced by the user. The display interface may include a specific description of the conference room 2. The conference room 2 is located at J2-1-1B2. The conference room 2 is a high security level conference room that can accommodate a maximum of 30 people. After detecting an operation that the user taps a control of "Instant navigation", the mobile phone may display a GUI shown in FIG. 10(d).

Figure 10D:
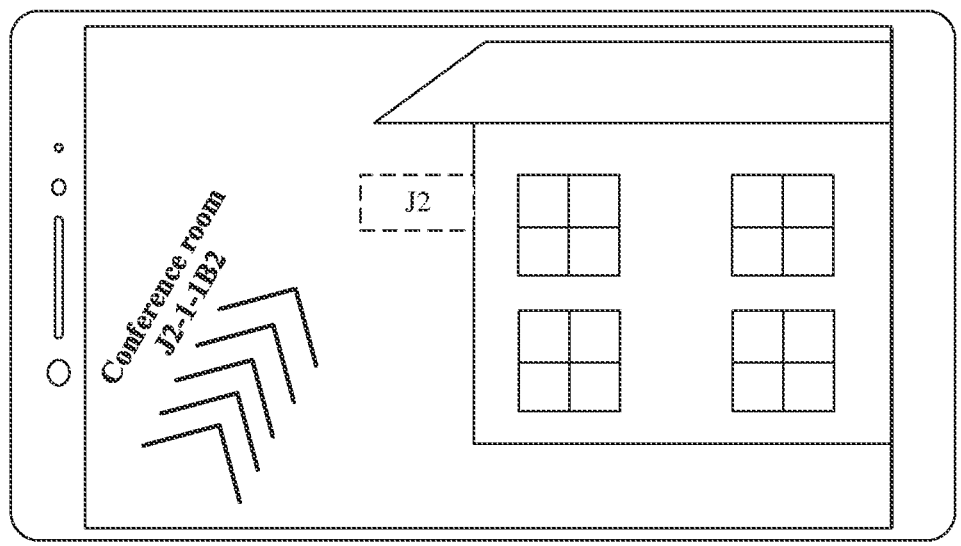

Refer to the GUI shown in FIG. 10(d). The GUI is a display interface for navigating to the conference room 2. The display interface may include a navigation arrow indication for navigating to the conference room 2. The user Laura may go to the conference room 2 by following the navigation arrow.

Figure 10E:
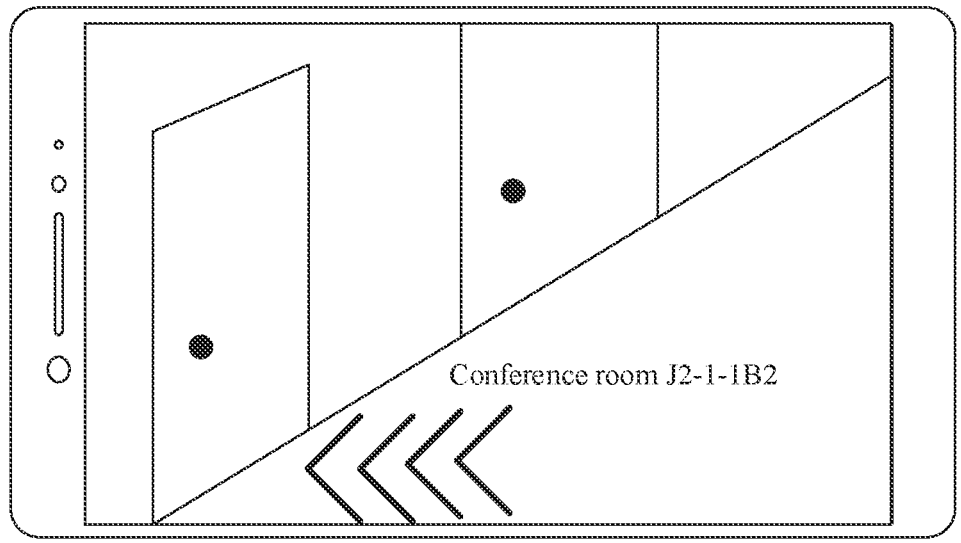

Refer to a GUI shown in FIG. 10(e). The GUI is another display interface for going to the conference room 2. After the user Laura enters the building J2 based on the walking path of the user Lee, the navigation arrow indication may continue to be displayed, so that the user can accurately find a room at which the conference room 2 is located in J2.

It should be understood that, in a process of recording the user experience in the Songshan lake research center, the user Lee navigates to the conference room 1, and both the conference room 1 and the conference room 2 appear in the process of recording the user experience by the user Lee. In this case, when performing experience, the user Laura may experience not only an experience process of going to the conference room 1, but also an experience process of going to the conference room 2.

During recording experience, the user Lee may save information about each building or each room in a building in the recording process. In this way, a shared user can experience a navigation process of each building or each room in each building. For example, in the GUIs shown in FIG. 4(a) to FIG. 4(f), although the user Lee does not experience the experience process of navigating to the conference room 2, information about the conference room 2 is also stored in the recording process. In this case, when the user Laura enjoys an immersive experience, the user Laura may perform experience of navigation to the conference room 2.

In this embodiment of this application, because both the conference room 1 and the conference room 2 appear in the process of recording experience of the user Lee, when the user Lee arrives at a door of the conference room 1, a cloud server may send location information of the conference room 1 and the conference room 2 to the mobile phone based on an image (the image includes the conference room 1 and the conference room 2) and location information uploaded by the mobile phone, so that the mobile phone can store the location information of the conference room 1 and the conference room 2 in experience data. When obtaining the experience data, the user Laura may also perform navigation experience of going to the conference room 1 based on the stored location information of the conference room 2.

Figure 11:
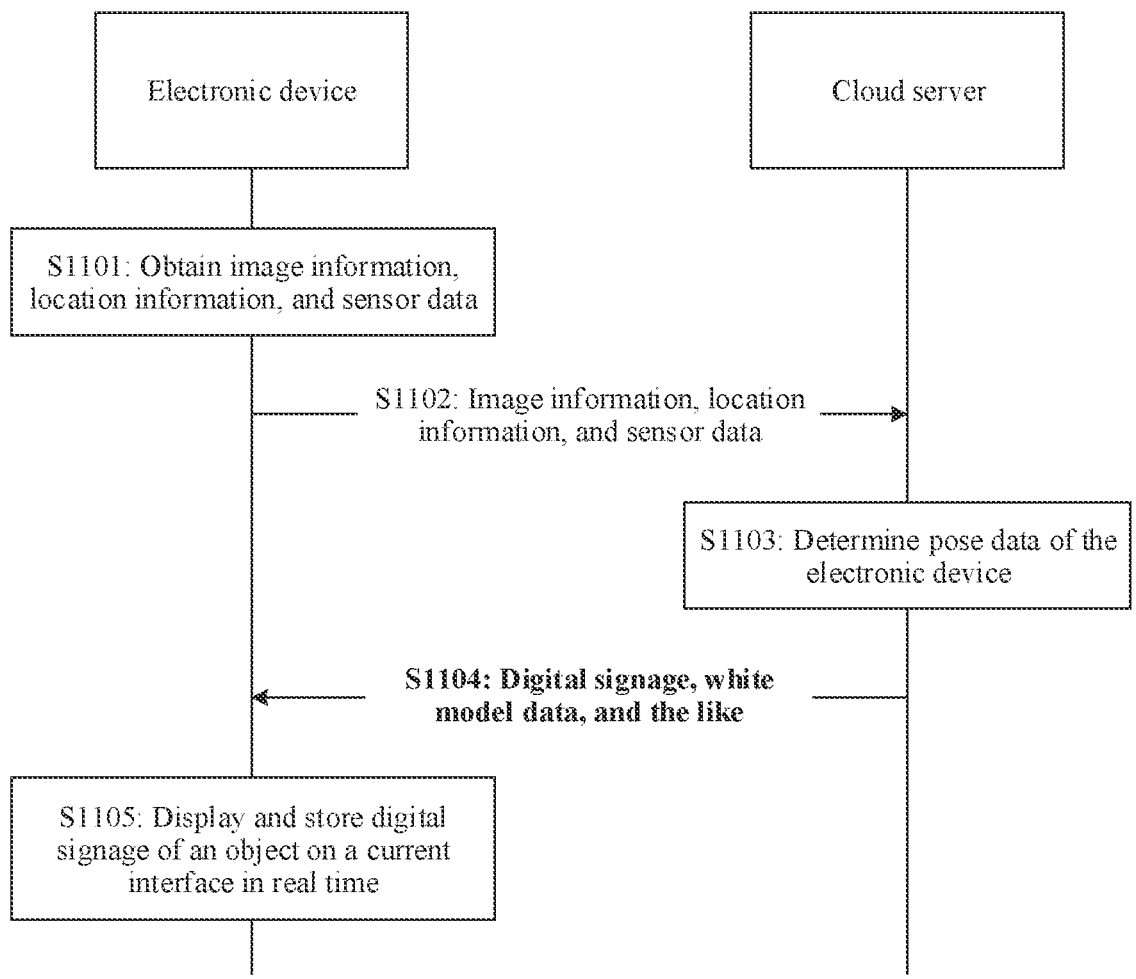
FIG. 11 is a schematic flowchart of interaction between an electronic device and a cloud server according to an embodiment of this application.

FIG. 11 is a schematic flowchart of interaction between an electronic device and a cloud server according to an embodiment of this application. As shown in FIG. 11, the method includes the following steps.

S1101: An electronic device obtains current location information, data detected by a sensor, and image information.

In an embodiment, the location information includes global positioning system (global positioning system, GPS) information of the electronic device. The electronic device may send, to the cloud server, related information such as image information collected by a camera of the electronic device and location information during collection of a corresponding image.

The data detected by the sensor includes data detected by a magnetometer sensor, data detected by an acceleration sensor, and data detected by a gyroscope sensor. The data detected by the magnetometer sensor, the data detected by the acceleration sensor, and the data detected by the gyroscope sensor are used to determine an orientation of the camera of the electronic device.

S1102: The electronic device sends, to the cloud server, image information in the experience data, location information during collection of the image information, and sensor data related to the electronic device.

For example, the electronic device may send, to the cloud server based on a specific period, the image information in the experience data, the location information during collection of the image, and the sensor data related to the electronic device.

For example, the electronic device may send, to the cloud server every 15 s, the image information in the experience data, the location information during collection of the image, and the sensor data related to the electronic device.

Alternatively, after moving from the current location by a preset distance, the electronic device may send, to the cloud server again, image information in updated experience data of the electronic device, location information during collection of the image, and sensor data related to the current electronic device.

Alternatively, when determining, by using an AI engine, that an object in the image collected by the camera is updated, the electronic device may send, to the cloud server again, updated image information, location information during collection of the image, and sensor data related to the electronic device.

S1103: The cloud server performs spatial calculation based on the image information, the location information, and the sensor data that are uploaded this time, to determine pose data of the electronic device, where the pose data includes location information of the electronic device and an orientation of the camera.

In this embodiment of this application, the location information (for example, GPS information) obtained by the electronic device has a relatively large error, and the error may range from 10 meters to 40 meters. The cloud server may determine the location information of the electronic device again, based on the location information and the image information that are uploaded by the electronic device. An error of the location information determined by the cloud server is at a centimeter level.

The cloud server may determine the orientation of the camera of the electronic device based on the sensor data and the image information that are uploaded by the electronic device.

In an embodiment, the electronic device may also determine the orientation of the camera based on the collected sensor data, and send the orientation of the camera determined by the electronic device to the cloud server. After calculating the orientation of the camera of the electronic device, the cloud server may correct, based on the orientation of the camera determined by the electronic device, the orientation of the camera determined by the cloud server.

S1104: The cloud server may determine, based on the pose data and the digital world stored in the cloud server by using a 3D map, and digital signage and white model data of an object that are stored in the digital world, digital signage and white model data that correspond to each object in the image collected by the camera of the current electronic device, so as to send the data signage, the white model data, and the like in the image information to the electronic device.

In this embodiment of this application, the cloud server may include two services:

(1) Space Calculation

The cloud server may perform spatial calculation based on the image information and the location information that are sent by the electronic device, to obtain more accurate location information. The cloud server may perform spatial calculation based on the image information and the sensor data that are sent by the electronic device, to obtain the orientation of the camera of the electronic device.

(2) Delivery of Digital Signage and White Model Data

After determining the pose data of the electronic device, the cloud server may determine, by using information about the digital world and the pose information that are stored in the cloud server, data (for example, digital signage and white model data of a building) of an object in the image collected by the camera, so as to send the data to the electronic device.

In this embodiment of this application, the white model data may refer to a three-dimensional structure of the object. The three-dimensional structure may include a length, a width, and a height of the object. Each object in the digital world stored in the cloud by the cloud server has its own three-dimensional structure. The cloud server may send the three-dimensional structure corresponding to the object to the electronic device, and the electronic device stores the three-dimensional structure. For example, if the object is a building, the white model data of the building may include a length, a width, and a height of the building, and information about each room in the building. The cloud server may further deliver information about white model data and digital signage of an object beside the building to the electronic device. It should be understood that the three-dimensional structure of the object is used by the electronic device to determine the three-dimensional structure of each object in the collected two-dimensional image, and the white model data is not presented on the display interface of the electronic device.

S1105: The electronic device performs image rendering, and displays and stores digital signage information of a photographed object on a current interface in real time.

For example, the "Cafe", the "J10 entrance", and the "Supermarket" shown in FIG. 3(d).

In this embodiment of this application, after obtaining the digital signage and the white model data, the electronic device needs to match the data with the object in the image collected by the camera. The electronic device obtains the correspondence between the object and the digital signage and the white model data from the cloud server, so that the electronic device displays information about the digital signage of the corresponding object in real time. The electronic device may upload, to the cloud server, an image collected by the camera, data collected by the sensor, and location information. The cloud server may also determine accurate location information of the current electronic device and orientation information of the camera based on the information.

As shown in FIG. 3(d), the building on the left corresponds to the digital signage "Cafe" and "J10 entrance", and the building on the right corresponds to the "Supermarket".

When the user Lee uses Cyberverse to experience the Songshan lake research center, data in the experience process includes video data, acceleration sensor data, gyroscope data, magnetometer data, pose data obtained through spatial calculation, pose data obtained by the AR engine, GPS and location-based service (location based services, LBS) data, map and white model data, and the like. The data is stored in a user-defined file format.

For example, Table 1 shows a data storage manner.

TABLE 1

| | | |
|---|---|---|
| File header | Application name | Cyberverse |
| | Version | 0.1 |
| | Total number of data types | 11 |
| | Name of a data type 1 | Video data |
| | Name of a data type 2 | Accelerometer sensor data |
| | Name of a data type 3 | Gyroscope data |
| | Name of a data type 4 | Magnetometer data |
| | Name of a data type 5 | Pose data obtained through spatial calculation |
| | Name of a data type 6 | Pose data obtained by the AR engine |
| | Name of a data type 7 | GPS and LBS data |
| | Name of a data type 8 | Digital resource |
| | Name of a data type 9 | 3D model data |
| | Name of a data type 10 | POI data |
| File body | Video data | Compressed video data |
| | Data length | xxxxx |
| | Accelerometer sensor data | Serialized data |
| | Data length | xxxxx |
| | Gyroscope data | Serialized data |
| | Data length | xxxxx |
| | Magnetometer data | Serialized data |
| | Data length | xxxxx |
| | Pose data obtained through spatial calculation | Serialized data |
| | Data length | xxxxx |
| | Pose data obtained by the AR engine | Serialized data |
| | Data length | xxxxx |
| | GPS and LBS data | Serialized data |
| | Data length | xxxxx |
| | Digital resource | Serialized data |
| | Data length | xxxxx |
| | 3D model data | Serialized data |
| | Data length | xxxxx |
| | POI data | Serialized data |
| | Data length | xxxxx |

In the data shown in Table 1, the video data, the acceleration sensor data, the gyroscope data, the magnetometer data, and the GPS and LBS data may be collected by the electronic device and sent to the cloud server. After receiving the data, the cloud server may calculate the pose data, the digital resources, the 3D model data, and the like, and send the pose data, the digital resources, the 3D model data, and the like to the electronic device for local storage. The digital resources include the digital signage and the white model data. The 3D model data may refer to some cartoon characters and virtual 3D objects, and is mainly used to enhance an immersive experience of the user.

For example, as shown in FIG. 3(c), when detecting that the user enables Cyberverse, the mobile phone may first upload GPS information to the cloud server. After obtaining the location information of the mobile phone, the cloud server may first determine, by using the GPS information, that the mobile phone is currently located at the Songshan lake. In this case, the cloud server may first send some digital resources about the Songshan lake to the mobile phone, for example, digital signage and white model data of a plurality of buildings at the Songshan lake.

For example, as shown in FIG. 3(d), when the user starts to experience, the mobile phone may send, to the cloud server, an image collected by the camera and GPS information. In this case, the cloud server may determine current pose data (including accurate location information and orientation information of the camera) of the mobile phone based on the digital world stored by the cloud server and the information uploaded by the mobile phone. In addition, the cloud server may further determine, based on the image collected by the camera of the mobile phone and the GPS information, white model data (or a three-dimensional structure) corresponding to each two-dimensional object in the image and data signage corresponding to each two-dimensional object. The cloud server may send the determined pose data of the mobile phone and the information about the digital resources to the mobile phone, and the mobile phone stores the determined pose data locally.

Figure 12:
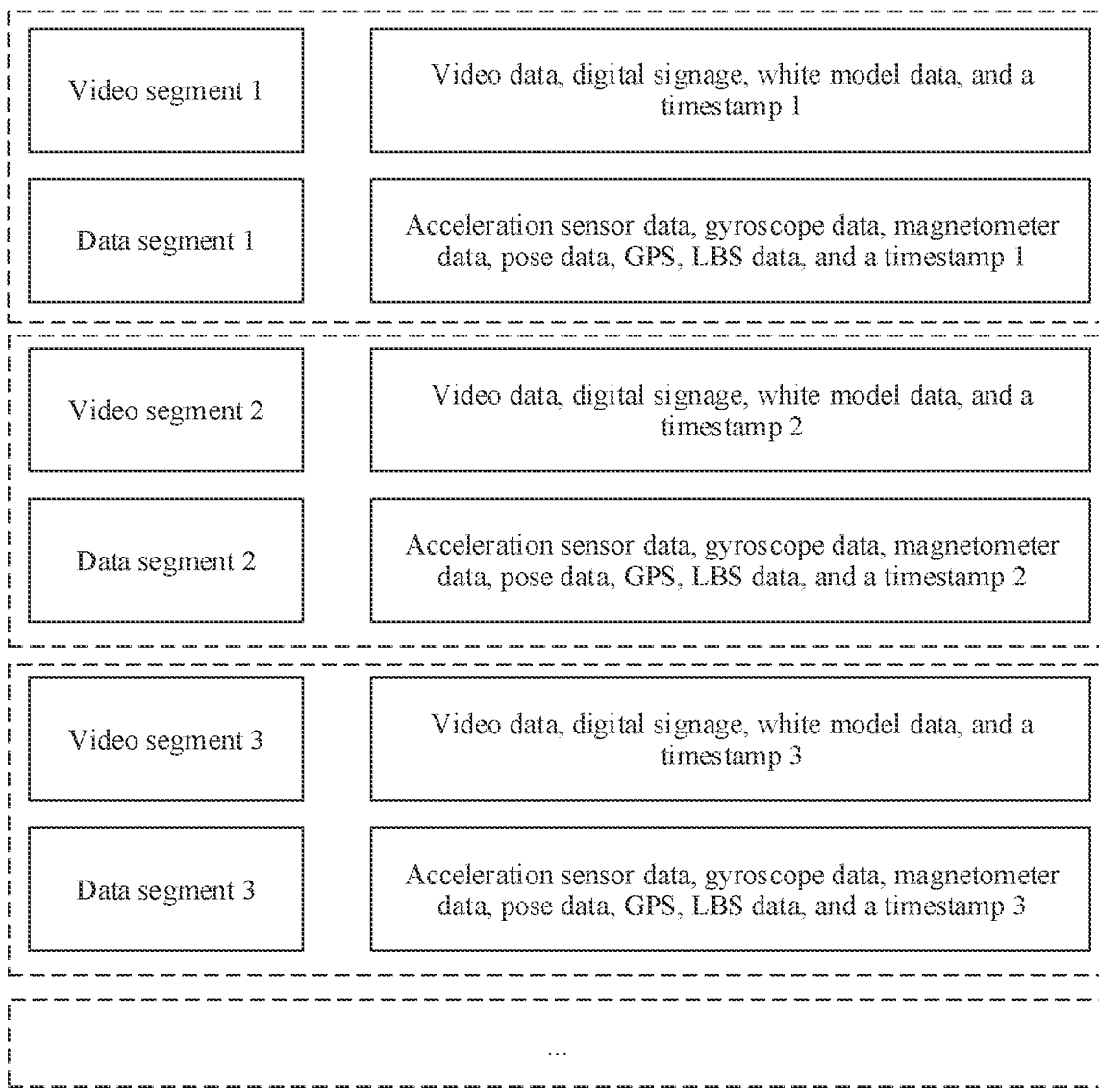
FIG. 12 is a schematic diagram of a structure of experience data storage according to an embodiment of this application.

In an embodiment, that the electronic device specifically stores the data in Table 1 may be shown in FIG. 12. FIG. 12 shows a format of data storage in a user experience process. Each timestamp corresponds to a video segment and a data segment, where the video segment includes information about video data, digital signage, white model data, and the timestamp, and the data segment includes information about acceleration sensor data, gyroscope data, magnetometer data, pose data, GPS, LBS data, and the timestamp.

After a file is stored in a customized file format, the user can share the file through various links. The file experience is implemented through the Cyberverse player. The player can parse the corresponding data from the file and replace the data with the data collected by the Cyberverse locally. In this way, data used by an application layer comes from experience data, and the local data is used to calculate movement of relative positions. This enhances user experience.

Figure 13:
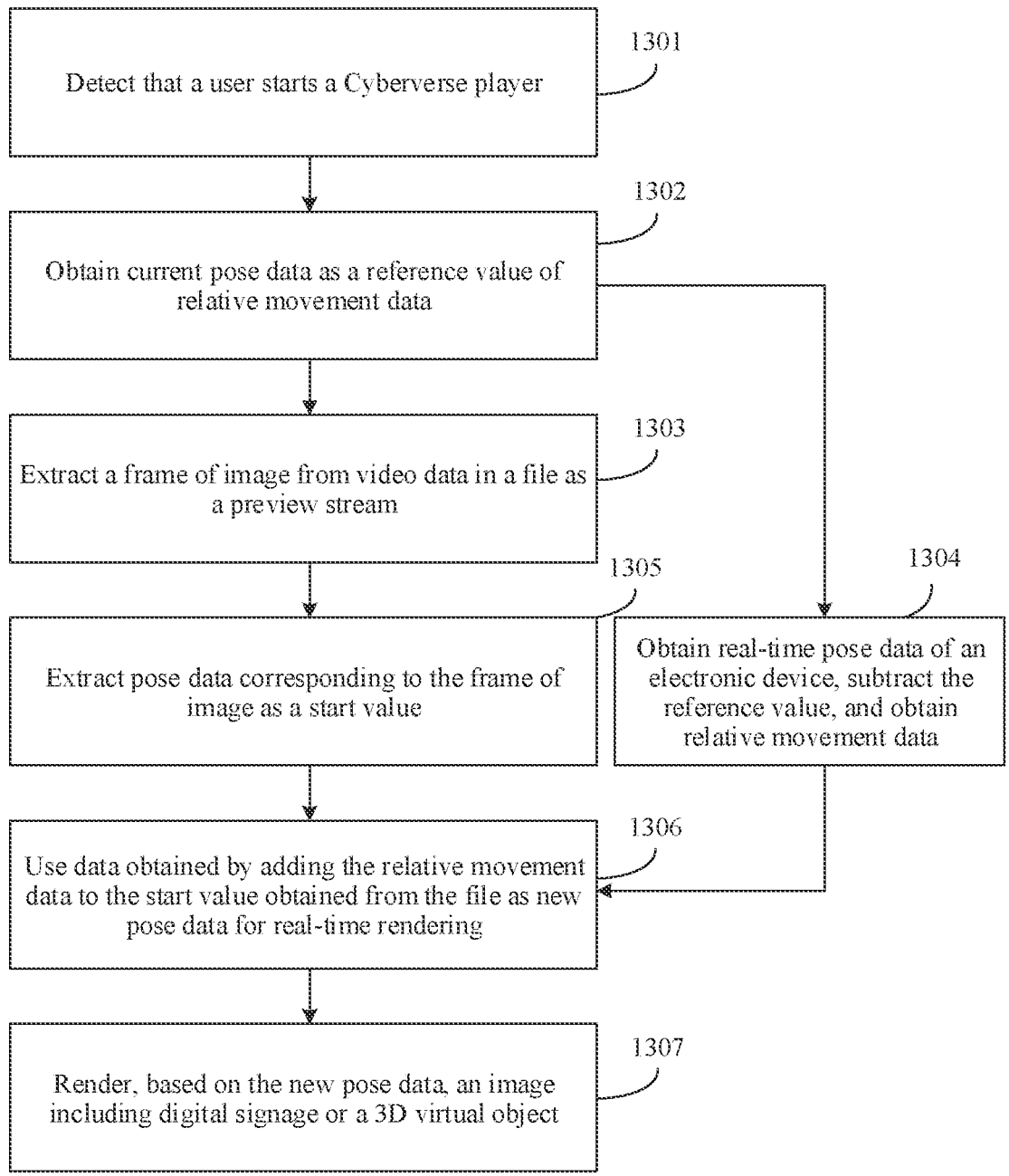
FIG. 13 is an algorithm procedure inside an electronic device during an immersive experience of a user according to an embodiment of this application.

FIG. 13 shows an algorithm procedure inside an electronic device when a user Laura enjoys an immersive experience. As shown in FIG. 13, the method includes the following steps.

S1301: An electronic device detects that a user starts a Cyberverse player.

For example, as shown in FIG. 6(b), the user Laura chooses to watch the experience data of Lee in the Songshan lake research center by using the Cyberverse player.

S1302: The electronic device obtains current pose data as a reference value.

For example, if the user Laura is currently using the electronic device in a living room at home, the electronic device may use current location information of the user Laura as a reference value of relative movement data.

In an embodiment, the pose data includes GPS data, LBS data, and inertial measurement unit (inertial measurement unit, IMU) data.

In this embodiment of this application, the LBS data may provide indoor positioning. For example, as shown in FIG. 4(e) and FIG. 4(f), the LBS data is positioning information of the electronic device indoors in J2.

The IMU data is a combination unit of the acceleration sensor and the gyroscope sensor. From the perspective of components, the acceleration sensor and the gyroscope sensor may be in the same chip. In this case, the chip is called IMU.

S1303: The electronic device extracts video data in the file as a preview stream.

For example, the electronic device may extract the video data in the video segment 1 in the experience data shown in FIG. 12 as the preview stream; or the electronic device may extract the video data in the video segment 2 in the experience data shown in FIG. 12 as the preview stream.

For example, as shown in FIG. 6(c), the electronic device may use the video data in the video segment 1 in the experience data as the preview stream.

S1304: Obtain real-time pose data of the electronic device, and subtract the reference value from the real-time pose data to obtain relative movement pose data.

It should be understood that there is no actual sequence between S1303 and S1304.

For example, the electronic device may obtain GPS, LBS, and IMU data of the electronic device in real time, and subtract the reference value in S1302 to obtain relative movement pose data. The relative movement pose data includes movement information of a location of the electronic device and a change of a camera posture.

For example, as shown in FIG. 8(b), the electronic device may determine, by subtracting the reference value from data obtained in real time, that the electronic device has moved 10 meters in the northeast direction. Alternatively, there is no obvious movement, but the orientation of the mobile phone changes.

S1305: The electronic device extracts pose data (location and posture data) that is obtained after spatial calculation and that is stored in the experience data, and uses the pose data as a start value.

For example, if the electronic device extracts the video data in the video segment 1 as the preview stream in S1303, the data segment 1 corresponding to the video segment 1 may be extracted in S1305 as a start value of the pose data.

If the electronic device extracts the video data in the video segment 2 as the preview stream in S1303, the data segment 2 corresponding to the video segment 1 may be extracted in S1305 as the start value of the pose data.

S1306: The electronic device determines new pose data rendered in real time based on data obtained by adding the start value obtained from the file and the relative movement data.

The pose data in this embodiment of this application indicates the location and the posture of the electronic device. Each time the electronic device performs rendering, the electronic device needs to know the location and the posture of the camera, so as to determine which information is to be displayed on the display.

S1307: The electronic device performs data rendering based on the new pose data, to render an image including digital signage or a 3D virtual object.

Based on startup of the normal Cyberverse application, the electronic device obtains current GPS/LBS/IMU data of the mobile phone, and uses the current GPS/LBS/IMU data as a reference number for subsequent relative movement. When the mobile phone moves subsequently, the mobile phone obtains real-time GPS/LBS/IMU data and subtracts the reference data to obtain relative movement data. Then, the data parsed from the file is read. The data of the preview interface uses the video data in the file, and the GPS/LBS/IMU data in the original data collection process also uses the corresponding start value stored in the file. When the electronic device moves subsequently, the start value added to the real-time relative movement data is used as anew value in the experience process.

In an embodiment, the electronic device may further obtain image data in the experience data and other information such as location information corresponding to the image data, and upload the image data and the other information to the cloud server. The cloud server performs real-time space calculation to obtain new pose data as an onsite start value.

The electronic device may store a data structure shown in FIG. 12. A data segment in the data structure shown in FIG. 12 may include data obtained through calculation by the cloud server, for example, pose data (location and posture data) obtained through space calculation by the cloud server. Alternatively, the pose data obtained through calculation by the cloud server may not be stored, but location information during collection of corresponding image information by the electronic device and data collected by the sensor are stored. When the shared user opens the experience data, the electronic device may upload, to a remote server again, image data of a frame collected by the electronic device, location information corresponding to the image data of the frame, and sensor data during collection of the image data of the frame. The cloud server obtains pose data of the electronic device through spatial calculation. The cloud server may determine the information about the object in the image based on the pose data, and send the information about the object to the electronic device. In a subsequent movement process of the electronic device, the electronic device may perform rendering based on the start value and the relative movement pose data.

An embodiment of this application further provides an electronic device, including a processor (for example, the processor 110 in FIG. 1) and one or more memories (for example, the internal memory 121 in FIG. 1). The one or more memories are coupled to the processor. The one or more memories are configured to store computer program code. The computer program code includes computer instructions. When the one or more processors execute the computer instructions, the electronic device is enabled to perform the method in the foregoing method 1300.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, for example, a USB flash drive, a removable hard disk, a read-only memory (read-only memory, ROM), a random access memory (random access memory, RAM), magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image display method, wherein the method comprises:
   detecting, by an electronic device, an operation of opening experience data by a user, wherein the electronic device has a camera and a display, the electronic device stores the experience data, the experience data comprises video data, pose data, and one or more digital resources, the video data comprises a plurality of frames of images, the pose data comprises location information and an orientation of the camera during collection of each of the plurality of frames of images, and the digital resources comprise digital signage or a three-dimensional (3D) model of an object in each of the plurality of frames of images;
   displaying, by the electronic device, a first interface by using the display in response to the operation, wherein the first interface comprises a first image, and the plurality of frames of images comprise the first image;
   sending, by the electronic device to a cloud server, first location information of the electronic device during collection of the first image, wherein the first location information is determined by the electronic device;
   receiving, by the electronic device from the cloud server, second location information of the camera and orientation information of the camera during collection of the first image, wherein the second location information and the orientation information are determined by the cloud server;
   determining, by the electronic device, pose change information within a preset duration, wherein the pose change information comprises location movement information of the electronic device and pose change information of the camera; and
   displaying, by the electronic device by using the display and based on the pose change information, the second location information, and the orientation information, a second image comprising digital signage or a 3D virtual object, wherein the plurality of frames of images comprise the second image.

2. The method according to claim 1, wherein the first interface further comprises prompt information, the prompt information is used to prompt the user to experience based on a preset path, and the preset path is a moving path during collection of the experience data.

3. The method according to claim 1, wherein the pose data during the collection of the first image is determined by the cloud server.

4. The method according to claim 1, wherein the determining, by the electronic device, pose change information within a preset duration comprises:
determining, by the electronic device, the pose change information based on changes of data of a global positioning system (GPS), a location based service (LBS), and an inertial measurement unit (IMU) detected at a start moment and an end moment of the preset duration.

5. The method according to claim 1, wherein the pose data and the digital resources are stored by using serialized data.

6. An electronic device, wherein the electronic device comprises:
a display;
a camera;
one or more processors; and
one or more memories, wherein:
the one or more memories store one or more computer programs, the one or more computer programs comprise instructions, and when the instructions are executed by the one or more processors, the electronic device is enabled to perform operations comprising:
detecting an operation of opening experience data by a user, wherein the electronic device stores the experience data, the experience data comprises video data, pose data, and one or more digital resources, the video data comprises a plurality of frames of images, the pose data comprises location information and an orientation of the camera during collection of each of the plurality of frames of images, and the digital resources comprise digital signage or a three-dimensional (3D) model of an object in each of the plurality of frames of images;
displaying, by using the display, a first image in response to the operation, wherein the plurality of frames of images comprise the first image;
sending, to a cloud server, first location information of the electronic device during collection of the first image, wherein the first location information is determined by the electronic device;
receiving, from the cloud server, second location information of the camera and orientation information of the camera during collection of the first image, wherein the second location information and the orientation information are determined by the cloud server;
determining pose change information within a preset duration, wherein the pose change information comprises location movement information of the electronic device and pose change information of the camera; and
displaying, by using the display and based on the pose change information, the second location information, and the orientation information, a second image comprising digital signage or a 3D virtual object, wherein the plurality of frames of images comprise the second image.

7. The electronic device according to claim 6, wherein the first image comprises prompt information, the prompt information is used to prompt the user to experience based on a preset path, and the preset path is a moving path during collection of the experience data.

8. The electronic device according to claim 6, wherein the pose data during the collection of the first image is determined by the cloud server.

9. The electronic device according to claim 6, wherein the determining pose change information within a preset duration comprises:
determining the pose change information based on changes of data of a global positioning system (GPS), a location based service (LBS), and an inertial measurement unit (IMU) detected at a start moment and an end moment of the preset duration.

10. The electronic device according to claim 6, wherein the pose data and the digital resources are stored by using serialized data.

11. A non-transitory, computer-readable medium storing one or more instructions executable by a computer system to perform operations comprising:
detecting, by an electronic device, an operation of opening experience data by a user, wherein the electronic device has a camera and a display, the electronic device stores the experience data, the experience data comprises video data, pose data, and one or more digital resources, the video data comprises a plurality of frames of images, the pose data comprises location information and an orientation of the camera during collection of each of the plurality of frames of images, and the digital resources comprise digital signage or a three-dimensional (3D) model of an object in each of the plurality of frames of images;
displaying, by the electronic device, a first interface by using the display in response to the operation, wherein the first interface comprises a first image, and the plurality of frames of images comprise the first image;
sending, by the electronic device to a cloud server, first location information of the electronic device during collection of the first image, wherein the first location information is determined by the electronic device;
receiving, by the electronic device from the cloud server, second location information of the camera and orientation information of the camera during collection of the first image, wherein the second location information and the orientation information are determined by the cloud server;
determining, by the electronic device, pose change information within a preset duration, wherein the pose change information comprises location movement information of the electronic device and pose change information of the camera; and
displaying, by the electronic device by using the display and based on the pose change information, the second location information, and the orientation information, a second image comprising digital signage or a 3D virtual object, wherein the plurality of frames of images comprise the second image.

12. The non-transitory, computer-readable medium according to claim 11, wherein the first interface further comprises prompt information, the prompt information is used to prompt the user to experience based on a preset path, and the preset path is a moving path during collection of the experience data.

13. The non-transitory, computer-readable medium according to claim 11, wherein the pose data during the collection of the first image is determined by the cloud server.

14. The non-transitory, computer-readable medium according to claim 11, wherein the determining, by the electronic device, pose change information within a preset duration comprises:
determining, by the electronic device, the pose change information based on changes of data of a global positioning system (GPS), a location based service (LBS), and an inertial measurement unit (IMU) detected at a start moment and an end moment of the preset duration.

15. The non-transitory, computer-readable medium according to claim 11, wherein the pose data and the digital resources are stored by using serialized data.

16. The method according to claim 2, wherein the pose data during the collection of the first image is determined by the cloud server.

17. The method according to claim 2, wherein the determining, by the electronic device, pose change information within a preset duration comprises:
determining, by the electronic device, the pose change information based on changes of data of a global positioning system (GPS), a location based service (LBS), and an inertial measurement unit (IMU) detected at a start moment and an end moment of the preset duration.

18. The method according to claim 2, wherein the pose data and the digital resources are stored by using serialized data.

19. The method according to claim 3, wherein the determining, by the electronic device, pose change information within a preset duration comprises:
determining, by the electronic device, the pose change information based on changes of data of a global positioning system (GPS), a location based service (LBS), and an inertial measurement unit (IMU) detected at a start moment and an end moment of the preset duration.

20. The method according to claim 3, wherein the pose data and the digital resources are stored by using serialized data.

* * * * *